United States Patent
Jiang et al.

(10) Patent No.: US 12,015,568 B2
(45) Date of Patent: Jun. 18, 2024

(54) BASE STATION, METHOD, PROGRAM, AND RECORDING MEDIUM

(71) Applicant: NEC Corporation, Tokyo (JP)

(72) Inventors: Yi Jiang, Tokyo (JP); Yasushi Maruta, Tokyo (JP)

(73) Assignee: NEC CORPORATION, Tokyo (JP)

( * ) Notice: Subject to any disclaimer, the term of this patent is extended or adjusted under 35 U.S.C. 154(b) by 236 days.

(21) Appl. No.: 17/627,971

(22) PCT Filed: Jul. 30, 2020

(86) PCT No.: PCT/JP2020/029228
§ 371 (c)(1),
(2) Date: Jan. 18, 2022

(87) PCT Pub. No.: WO2021/024903
PCT Pub. Date: Feb. 11, 2021

(65) Prior Publication Data
US 2022/0278783 A1   Sep. 1, 2022

(30) Foreign Application Priority Data
Aug. 5, 2019   (JP) .................................. 2019-143900

(51) Int. Cl.
*H04L 5/00* (2006.01)
*H04B 1/715* (2011.01)

(52) U.S. Cl.
CPC ........... *H04L 5/0005* (2013.01); *H04B 1/715* (2013.01); *H04L 5/0037* (2013.01); *H04B 2001/7154* (2013.01)

(58) Field of Classification Search
None
See application file for complete search history.

(56) References Cited

U.S. PATENT DOCUMENTS

| 6,256,334 B1 * | 7/2001 | Adachi | H04B 1/7143 |
| | | | 375/138 |
| 6,275,518 B1 * | 8/2001 | Takahashi | H04B 7/2621 |
| | | | 375/135 |

(Continued)

FOREIGN PATENT DOCUMENTS

| CN | 101183882 A | 5/2008 |
| EP | 2988561 A1 | 2/2016 |

(Continued)

OTHER PUBLICATIONS

JP Office Action for JP Application No. 2021-537267, dated Nov. 29, 2022 with English Translation.

(Continued)

*Primary Examiner* — Christopher T Wyllie
(74) *Attorney, Agent, or Firm* — Sughrue Mion, PLLC

(57) ABSTRACT

In order to improve communication in a radio access network, a base station 100 includes: a first communication processing unit 141 configured to communicate with a terminal apparatus 400A; and a second communication processing unit 143 configured to receive, from base stations 200 and 300 respectively communicating with terminal apparatuses 400B and 400C, radio resource time length information for specifying a time length of a radio resource for the terminal apparatuses 400B and 400C, and hopping pattern information for specifying a frequency hopping pattern for the terminal apparatuses 400B and 400C. The first communication processing unit 141 is configured to determine the frequency hopping pattern for the terminal apparatus 400A, based on the radio resource time length information and the hopping pattern information, and communicate with the terminal apparatus 400A in accordance with the determined frequency hopping pattern.

11 Claims, 12 Drawing Sheets

(56) References Cited

U.S. PATENT DOCUMENTS

| | | | |
|---|---|---|---|
| 2001/0022806 A1* | 9/2001 | Adachi | H04B 1/7143 375/E1.035 |
| 2006/0013285 A1 | 1/2006 | Kobayashi et al. | |
| 2008/0089306 A1 | 4/2008 | Hu | |
| 2012/0307869 A1 | 12/2012 | Charbit | |
| 2014/0362832 A1 | 12/2014 | Rudolf et al. | |
| 2015/0289144 A1 | 10/2015 | Yi et al. | |
| 2016/0081101 A1 | 3/2016 | Yu | |
| 2017/0163391 A1 | 6/2017 | Kimura et al. | |
| 2017/0187499 A1* | 6/2017 | Hwang | H04L 5/0051 |
| 2017/0373715 A1 | 12/2017 | Moroga et al. | |
| 2019/0327760 A1* | 10/2019 | Holfeld | H04W 72/23 |
| 2021/0289509 A1 | 9/2021 | Saito et al. | |
| 2022/0140966 A1 | 5/2022 | Choi et al. | |

FOREIGN PATENT DOCUMENTS

| | | | | |
|---|---|---|---|---|
| EP | 3731447 | A1 | 10/2020 | |
| JP | H08-204615 | A | 8/1996 | |
| JP | H10-098414 | A | 4/1998 | |
| JP | H10-261980 | A | 9/1998 | |
| JP | 2019-143900 | A | 8/2019 | |
| WO | 2016/031343 | A1 | 3/2016 | |
| WO | 2016/121911 | A1 | 8/2016 | |
| WO | 2018/030098 | A1 | 2/2018 | |
| WO | WO-2018137554 | A1 * | 8/2018 | H04J 11/00 |
| WO | 2019/125062 | A1 | 6/2019 | |

OTHER PUBLICATIONS

U.S. Office Action for U.S. Appl. No. 16/981,107, dated Jun. 2, 2023.
U.S. Office Action for U.S. Appl. No. 16/981,107, dated Dec. 1, 2022.
Extended European Search Report for EP Application No. 20850269.0, dated Jun. 14, 2022.
U.S. Office Action for U.S. Appl. No. 16/981,107, dated May 26, 2022.
NEC, "Frequency hopping for NR UL PUSCH", 3GPP TSG-RAN WG1 Meeting #90bisPrague, Czech Republic, Oct. 9-13, 2017, R1-1717153, pp. 1-3.
International Search Report for PCT Application No. PCT/JP2020/029228, dated Oct. 6, 2020.
International Search Report dated Apr. 23, 2019 for PCT/JP2019/004167 which includes a subject matter related to the present invention.
WO/ISA dated Apr. 23, 2019 for PCT/JP2019/004167 which includes a subject matter related to the present Invention.
3GPP TS 38.300 V15.6.0 (Jun. 2019), "NR; NR and NG-RAN Overall Description", pp. 1-99.
R1-1720900, 3GPP TSG RAN WG1#91, NEC, "Frequency hopping schemes for NR UL PUSCH", Dec. 1, 2017, pp. 1-5.
3GPP TS36.213 V15.0.0 (Dec. 2017), "Evolved Universal Terrestrial Radio Access (E-UTRA);Physical layer procedures", pp. 1-492.

\* cited by examiner

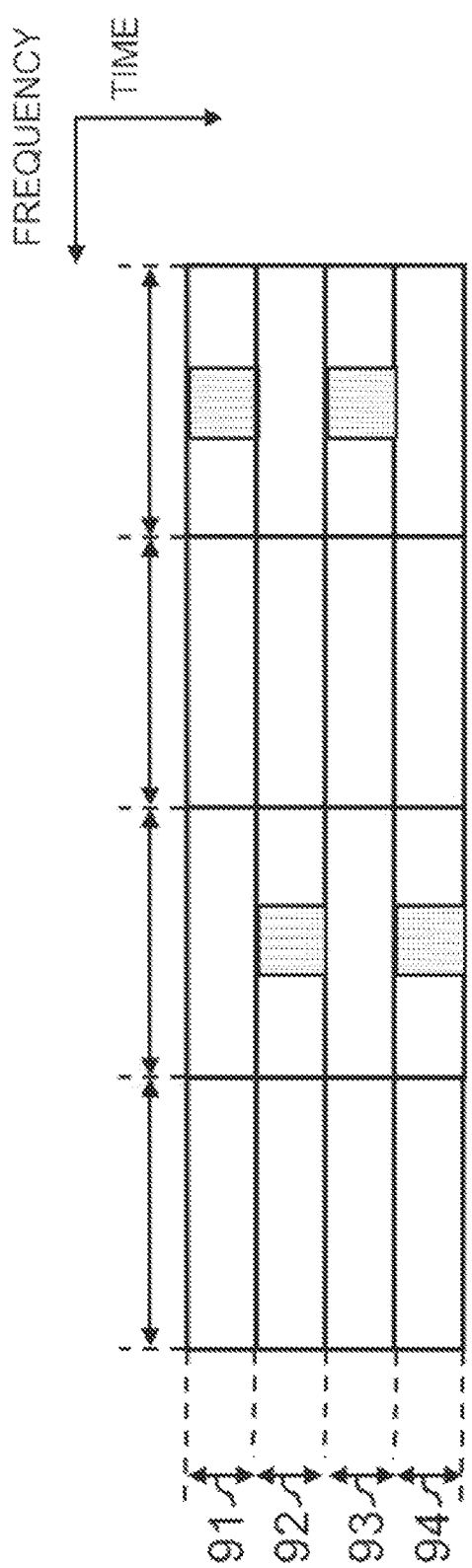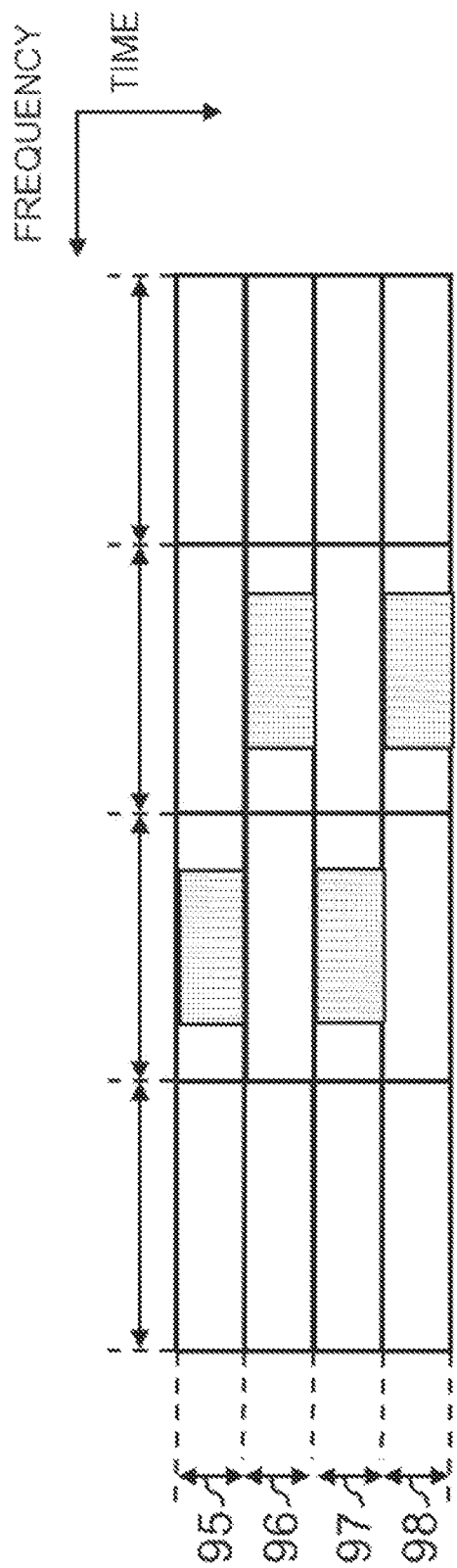
Fig. 9

BASE STATION, METHOD, PROGRAM, AND RECORDING MEDIUM

This application is a National Stage Entry of PCT/JP2020/029228 filed on Jul. 30, 2020, which claims priority from Japanese Patent Application 2019-143900 filed on Aug. 5, 2019, the contents of all of which are incorporated herein by reference, in their entirety.

BACKGROUND

Technical Field

The present invention relates to a base station, a method, a program, and a recording medium.

Background Art

In Long Term Evolution (LTE) and New Radio (NR) that is established as a succeeding standard of LTE, frequency hopping is used in order to achieve frequency diversity. For example, as frequency hopping of an uplink, Physical Uplink Shared Channel (PUSCH) frequency hopping is performed. The PUSCH frequency hopping is inter-slot frequency hopping within a subframe (Intra-subframe). For example, frequency resources used by a User Equipment (UE) in the second slot within a subframe are different from frequency resources used by the UE in the first slot within the subframe.

NR defines a Configured Grant (CG) for periodically (periodicity) allocating at least a part of radio resources for a specific terminal apparatus (for example, see NPL 1).

CITATION LIST

Non Patent Literature

NPL 1: 3GPP TS 38.300 V15.6.0 (2019/06)

SUMMARY

Technical Problem

However, unlike LTE, in New Radio (NR), it may be assumed that time lengths of radio resources such as slots are different between terminal apparatuses (for example, UEs). In this manner, in an environment in which terminal apparatuses possibly assumed to have different time lengths of radio resources as described above coexist, complicated operation may be required in order to have frequency hopping patterns for each of the terminal apparatuses cooperate with each other.

Specifically, the radio resources and the frequency hopping pattern allocated to a first terminal apparatus by a first base station may be the same as the radio resources and the frequency hopping pattern allocated to a second terminal apparatus by a second base station. In such a case, even when frequency hopping is performed, interference from the second terminal apparatus in the first base station may continuously occur for the entire period of the allocated radio resources.

For example, when the Configured Grant (CG) disclosed in NPL 1 is applied to each of the first and second terminal apparatuses and radio resources are allocated thereto for a long period, and the frequency hopping patterns of both of the terminal apparatuses are the same, both of the terminal apparatuses interfere with each other for a long period, causing significant deterioration in their characteristics (for example, throughput, success probability of data transmission, and the like).

The example object of the present invention is to provide a base station, a method, a program, and a recording medium that enable improvement of communication of a radio access network in an environment in which it may be assumed that time lengths of radio resources are different between terminal apparatuses.

Solution to Problem

According to one aspect of the present invention, a first base station includes: a first communication processing unit configured to communicate with a first terminal apparatus; and a second communication processing unit configured to receive, from a second base station communicating with a second terminal apparatus, radio resource time length information for specifying time length of a radio resource for the second terminal apparatus, and hopping pattern information for specifying a frequency hopping pattern for the second terminal apparatus, wherein the first communication processing unit is configured to determine a frequency hopping pattern for the first terminal apparatus based on the radio resource time length information and the hopping pattern information, and communicate with the first terminal apparatus in accordance with the determined frequency hopping pattern.

According to one aspect of the present invention, a method used in a first base station includes: communicating with a first terminal apparatus; and receiving, from a second base station communicating with a second terminal apparatus, radio resource time length information for specifying a time length of a radio resource for the second terminal apparatus, and hopping pattern information for specifying a frequency hopping pattern for the second terminal apparatus, wherein the communicating with the first terminal apparatus includes determining a frequency hopping pattern for the first terminal apparatus, based on the radio resource time length information and the hopping pattern information, and communicating with the first terminal apparatus in accordance with the determined frequency hopping pattern.

According to one aspect of the present invention, a program is a program that causes a processor in a first base station to execute: communicating with a first terminal apparatus; and receiving, from a second base station communicating with a second terminal apparatus, radio resource time length information for specifying a time length of a radio resource for the second terminal apparatus, and hopping pattern information for specifying a frequency hopping pattern for the second terminal apparatus, wherein the communicating with the first terminal apparatus includes determining a frequency hopping pattern for the first terminal apparatus, based on the radio resource time length information and the hopping pattern information, and communicating with the first terminal apparatus in accordance with the determined frequency hopping pattern.

According to one aspect of the present invention, a recording medium is a non-transitory computer readable recording medium storing a program that causes a processor in a first base station to execute: communicating with a first terminal apparatus; and receiving, from a second base station communicating with a second terminal apparatus, radio resource time length information for specifying a time length of a radio resource for the second terminal apparatus, and hopping pattern information for specifying a frequency hopping pattern for the second terminal apparatus, wherein the communicating with the first terminal apparatus includes determining a frequency hopping pattern for the first terminal apparatus, based on the radio resource time length information and the hopping pattern information, and communicating with the first terminal apparatus in accordance with the determined frequency hopping pattern.

Advantageous Effects of Invention

According to the present invention, communication of a radio access network can be improved in an environment in which it may be assumed that time lengths of radio resources are different between terminal apparatuses. Note that, according to the present invention, instead of or together with the above effects, other effects may be exerted.

BRIEF DESCRIPTION OF THE DRAWINGS

FIG. 9 is a diagram for illustrating an example alteration according to the first example embodiment.

DESCRIPTION OF THE EXAMPLE EMBODIMENTS

Figure 1:
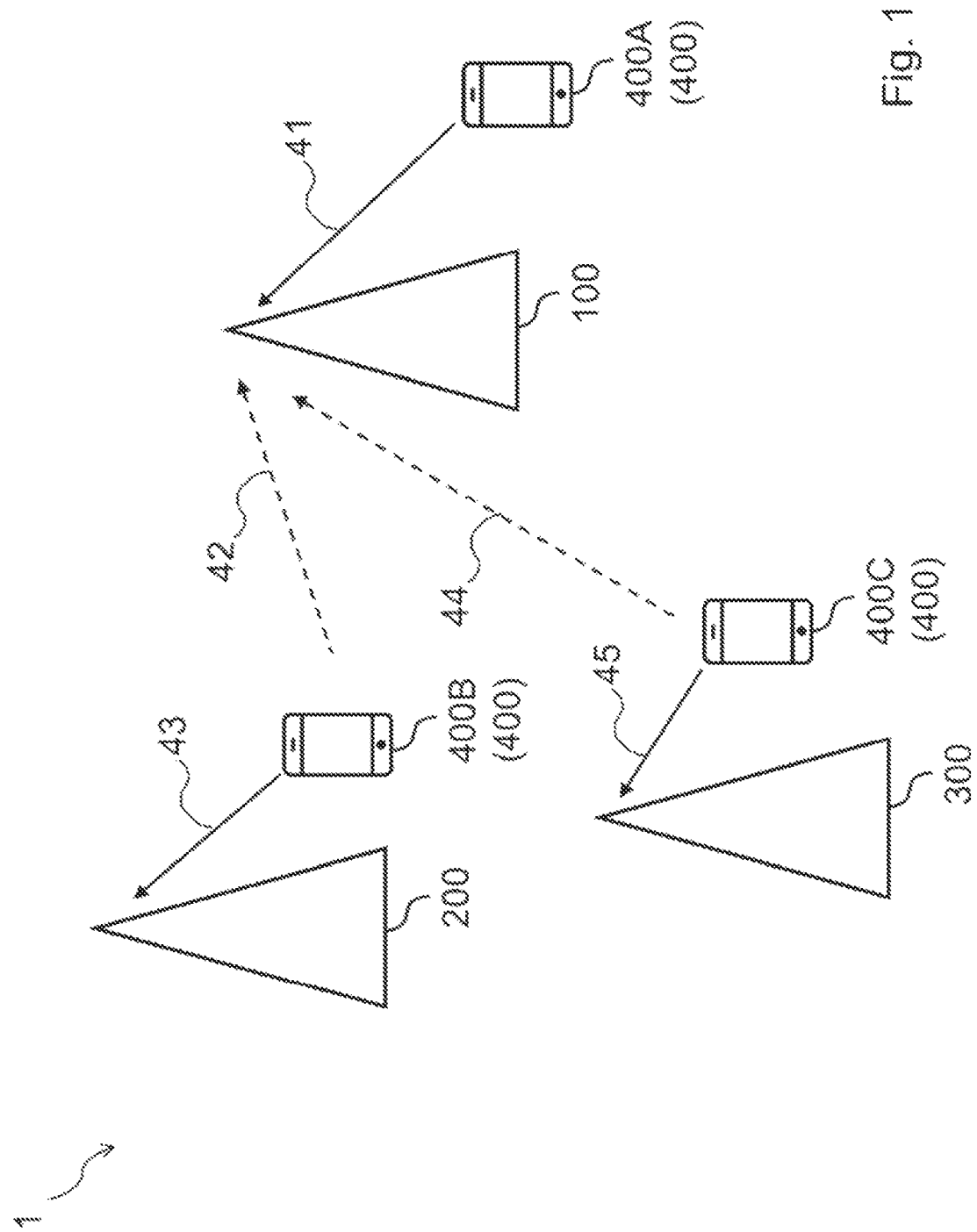
FIG. 1 is an explanatory diagram illustrating an example of a schematic configuration of a system 1 according to a first example embodiment.

Hereinafter, example embodiments of the present invention will be described in detail with reference to the accompanying drawings. Note that, in the Specification and drawings, elements to which similar descriptions are applicable are denoted by the same reference signs, and overlapping descriptions may hence be omitted.

Descriptions will be given in the following order.
1. Overview of Example Embodiment of Present Invention
2. First Example Embodiment 2.1. Configuration of System
2.2. Configuration of Each Node
   2.2.1. Configuration of Base Station 100
   2.2.2. Configuration of Base Station 200
   2.2.3. Configuration of Base Station 300
2.3. Technical Features
2.4. Example Alterations
3. Second Example Embodiment
3.1. Configuration of System
3.2. Configuration of Base Station 600
3.3. Technical Features
4. Other Example Embodiments 1. Overview of Example Embodiment of Present Invention First, an overview of example embodiments of the present invention will be described.
(1) Technical Issues In Long Term Evolution (LTE) and New Radio (NR) that is established as a succeeding standard of LTE, frequency hopping is used in order to achieve frequency diversity. For example, as frequency hopping of an uplink, Physical Uplink Shared Channel (PUSCH) frequency hopping is performed. The PUSCH frequency hopping is inter-slot frequency hopping within a subframe (Intra-subframe). For example, frequency resources used by a User Equipment (UE) in the second slot within a subframe are different from frequency resources used by the UE in the first slot within the subframe.

NR defines a Configured Grant (CG) for periodically (periodicity) allocating at least a part of radio resources for a specific terminal apparatus. Specifically, NR defines a CG of type 1 and a CG of type 2. With the CG of type 1, the base station uses Radio Resource Control (RRC) to directly indicate a period of allocating uplink radio resources for a specific terminal apparatus. With the CG of type 2, the base station uses Radio Resource Control (RRC) to define a period of allocating uplink radio resources for a specific terminal apparatus, whereas the base station uses an address-designated Physical Downlink Control CHannel (PDCCH) for the terminal apparatus to activate or deactivate permission (Grant) of resource allocation.

However, unlike LTE, in New Radio (NR), it may be assumed that time lengths of radio resources such as slots are different between terminal apparatuses (for example, UEs).

For example, in LTE, one subframe is 1 ms, and in principle corresponds to a Transmission Time Interval (TTI) as well. In LTE, one slot is 0.5 ms (in other words, two slots correspond to one subframe.) The number of Orthogonal Frequency Division Multiplexing (OFDM) symbols in one subframe is 14 in a case of a Normal Cyclic Prefix (CP). Further, a subcarrier spacing (SCS) is fixed to 15 kHz.

In NR, one subframe is 1 ms, and the number of OFDM symbols in one slot is 14. In NR, a subcarrier spacing (SCS) is 15 kHz, 30 kHz, 60 kHz, or 120 kHz. In this manner, the subcarrier spacing (SCS) varies, and thus the time length of one slot varies according to the subcarrier spacing (SCS). In addition, (one or more than one) possible value of the subcarrier spacing (SCS) is determined for each Frequency band. Thus, the time length of one slot may vary for each Frequency band as well.

Therefore, in NR, terminal apparatuses possibly assumed to have different time lengths of radio resources, such as the time lengths of slot as described above, may coexist, and thus complicated operation may be required in order to have frequency hopping patterns for each of the terminal apparatuses cooperate with each other.

Specifically, the radio resources and the frequency hopping pattern allocated to a first terminal apparatus by a first base station may be the same as the radio resources and the frequency hopping pattern allocated to a second terminal apparatus by a second base station. In such a case, even when frequency hopping is performed, interference from the second terminal apparatus in the first base station may continuously occur for the entire period of the allocated radio resources.

For example, when the Configured Grant (CG) disclosed in NPL 1 is applied to each of the first and second terminal apparatuses and radio resources are allocated thereto for a long period, and the frequency hopping patterns of both of the terminal apparatuses are the same, both of the terminal apparatuses interfere with each other for a long period, causing significant deterioration in their characteristics (for example, throughput, success probability of data transmission, and the like).

Specifically, the radio resources and the frequency hopping pattern allocated to the first terminal apparatus by the first base station may be the same as the radio resources and the frequency hopping pattern allocated to the second terminal apparatus by the second base station. In such a case, even when frequency hopping is performed, interference from the second terminal apparatus in the first base station may continuously occur for the entire period of the allocated radio resources.

For example, when the Configured Grant (CG) disclosed in NPL 1 is applied to each of the first and second terminal apparatuses and radio resources are allocated thereto for a long period, and the frequency hopping patterns of both of the terminal apparatuses are the same, both of the terminal apparatuses interfere with each other for a long period, causing significant deterioration in their characteristics (for example, throughput, success probability of data transmission, and the like).

One example object of the present example embodiment is to enable improvement of communication of a radio access network in an environment in which it may be assumed that time lengths of radio resources are different between terminal apparatuses.

(2) Technical Features

According to the present example embodiment, for example, a first base station receives, from a second base station communicating with a second terminal apparatus, radio resource time length information for specifying a time length of a radio resource for the second terminal apparatus, and hopping pattern information for specifying a frequency hopping pattern for the second terminal apparatus. Then, the first base station determines a frequency hopping pattern for a first terminal apparatus with which the first base station communicates, based on the radio resource time length information and the hopping pattern information, and communicates with the first terminal apparatus in accordance with the determined frequency hopping pattern.

With this configuration, for example, communication in a radio access network can be improved.

2. First Example Embodiment

With reference to FIG. 1 to FIG. 10, a first example embodiment will be described.

<<2.1. Configuration of System>>

Figure 2:
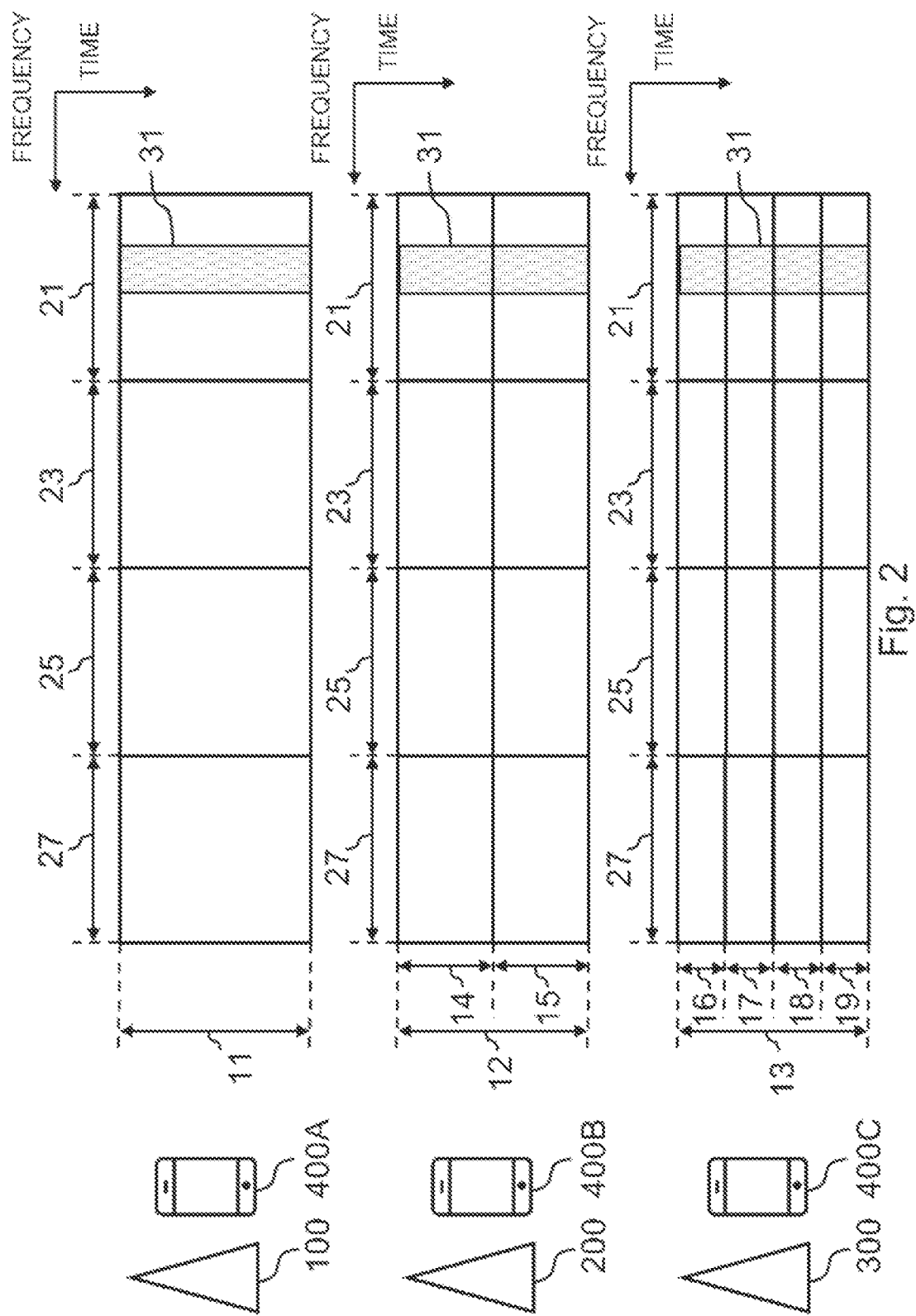
FIG. 2 is an explanatory diagram for illustrating an example of uplink radio resources (PUSCH resources) being allocated to terminal apparatuses by base stations.

With reference to FIGS. 1 to 2, an example of a configuration of a system 1 according to the first example embodiment will be described.

FIG. 1 is an explanatory diagram illustrating an example of a schematic configuration of the system 1 according to the first example embodiment. With reference to FIG. 1, the system 1 includes a base station 100, a base station 200, a base station 300, and a terminal apparatus 400. FIG. 1 illustrates three terminal apparatuses 400 (i.e., a terminal apparatus 400A, a terminal apparatus 400B, and a terminal apparatus 400C). However, the system 1 may include four or more terminal apparatuses 400, or may include only one or two terminal apparatuses 400.

The system 1 is, for example, a system conforming to standards/specifications of Third Generation Partnership Project (3GPP). More specifically, for example, the system 1 may be a system conforming to standards/specifications of LTE/LTE-Advanced. Alternatively, the system 1 may be a system conforming to standards/specifications of the fifth generation (5G)/New Radio (NR). The system 1 is, of course, not limited to these examples.

(1) Base Station 100, Base Station 200, and Base Station 300

The base station 100 is a node of a radio access network (RAN), and performs radio communication with a terminal apparatus (for example, the terminal apparatus 400) located in a coverage area. The RAN may be an E-UTRAN of LTE, or may be a Next Generation RAN (NG-RAN) of 5G NR.

For example, the base station 100 may be an evolved Node B (eNB) or a gNB in 5G NR. The base station 100 may include a plurality of units (or a plurality of nodes). The plurality of units (or the plurality of nodes) may include a first unit (or a first node) configured to perform higher protocol layer processing and a second unit (or a second node) configured to perform lower protocol layer processing. As an example, the first unit may be referred to as a center/central unit (CU), and the second unit may be referred to as a distributed unit (DU) or an access unit (AU). As another example, the first unit may be referred to as a digital unit (DU), and the second unit may be referred to as a radio unit (RU) or a remote unit (RU). The digital unit (DU) may be a base band unit (BBU), and the RU may be a remote radio head (RRH) or a remote radio unit (RRU). The terms for the first unit (or the first node) and the second unit (or the second node) are, of course, not limited to these examples. Alternatively, the base station 100 may be a single unit (or a single node). In this case, the base station 100 may be one of the plurality of units (e.g., either one of the first unit and the second unit) or may be connected to another unit of the plurality of units (e.g., the other one of the first unit and the second unit). Note that, instead of EPC of LTE, the eNB of LTE (E-UTRA) connected to a 5G core network (5GC) is also referred to as a ng-eNB, and this is included in the NG-RAN.

Description of the base station 200 and the base station 300 is also similar to description of the base station 100. Thus, overlapping description will be omitted herein.

Note that each of the base station 200 and the base station 300 may be a base station of a type the same as that of the base station 100, or may be a base station of a type different from that of the base station 100. For example, the base station 100 may be an eNB and the base station 200 (or the base station 300) may also be an eNB, or the base station 100 may be a gNB and the base station 200 (or the base station 300) may also be a gNB. Alternatively, the base station 100 may be one of an eNB and a gNB, and the base station 200 (or the base station 300) may be the other of the eNB and the gNB. Note that, as a matter of course, the base station 300 may be a base station of a type the same as that of the base station 200, or may be a base station of a type different from that of the base station 200.

Each of the base station 100, the base station 200, and the base station 300 may be the second unit and may be connected to the same first unit.

(2) Terminal Apparatus 400

The terminal apparatus 400 (wirelessly) communicates with a base station. For example, when the terminal apparatus 400 is located within a coverage area of a base station, the terminal apparatus 400 communicates with the base station.

For example, as illustrated in FIG. 1, the terminal apparatus 400A is connected to the base station 100 and communicates with the base station 100, the terminal apparatus 400B is connected to the base station 200 and communicates with the base station 200, and the terminal apparatus 400C is connected to the base station 300 and communicates with the base station 300.

For example, each terminal apparatus 400 is a UE.

(3) Interference

For example, the base station 100, the base station 200, and the base station 300 may allocate the same radio resources (the same time frequency resources) to each of the terminal apparatus 400A, the terminal apparatus 400B, and the terminal apparatus 400C. In this case, interference may occur.

Specifically, the terminal apparatus 400A transmits a signal 41 to the base station 100, the terminal apparatus 400B transmits a signal 43 to the base station 200, and the terminal apparatus 400C transmits a signal 45 to the base station 200. These signal 41, signal 43, and signal 45 are desired signals in the base station 100, the base station 200, and the base station 300, respectively.

FIG. 2 is an explanatory diagram for illustrating an example of uplink radio resources (PUSCH resources) being allocated to the terminal apparatuses by the base stations. With reference to FIG. 2, time frequency resources in subframes 11, 12, and 13 are illustrated. The subframe 11 includes one slot. The subframe 12 includes a first slot 14 and a second slot 15. The subframe 13 includes a first slot 16, a second slot 17, a third slot 18, and a fourth slot 19. In addition, in the frequency direction, there are subbands 21, 23, 25, and 27.

As illustrated in FIG. 2, the reason why a different slot length is configured for each of the base stations 100, 200, and 300 is that the base stations 100, 200, and 300 configure subcarrier spacings (SCS) different from each other. Thus, the terminal apparatuses 400A, 400B, and 400C having slot lengths different from each other coexist. Note that each of the base stations 100, 200, and 300 may configure the subcarrier spacing SCS for each cell.

Based on the assumption given above, for example, in the example illustrated in FIG. 2, the base station 100, the base station 200, and the base station 300 allocate a radio resource 31 to the terminal apparatus 400A, the terminal apparatus 400B, and the terminal apparatus 400C, respectively. The radio resource 31 is located for over a part of the subband 21 in the frequency direction and over the subband 21 in the time direction.

In such an environment in which the terminal apparatuses 400A, 400B, and 400C having slot lengths different from each other coexist as described above, complicated operation may be required in order to have the hopping patterns of the terminal apparatuses 400A, 400B, and 400C cooperate with each other.

With reference to FIG. 1, the terminal apparatus 400B is located near a boundary between the coverage of the base station 200 and the coverage of the base station 100, and thus the signal 42 from the terminal apparatus 400B (the same signal as the signal 43) reaches the base station 100. The signal 42 may be an interference signal in the base station 100. For example, with reference to FIG. 1, the terminal apparatus 400C is located near a boundary between the coverage of the base station 300 and the coverage of the base station 100, and thus the signal 44 from the terminal apparatus 400C (the same signal as the signal 45) reaches the base station 100. The signal 41 may be an interference signal in the base station 100.

In particular, when the Configured Grant (CG) is applied to the terminal apparatus 400A, the terminal apparatus 400B, and the terminal apparatus 400C, the interference may continuously occur for a long period. Specifically, NR defines a CG of type 1 and a CG of type 2. With the CG of type 1, the base station uses Radio Resource Control (RRC) to directly indicate a period of allocating uplink radio resources for a specific terminal apparatus. With the CG of type 2, the base station uses Radio Resource Control (RRC) to define a period of allocating uplink radio resources for a specific terminal apparatus, whereas the base station uses an address-designated Physical Downlink Control CHannel (PDCCH) for the terminal apparatus to activate or deactivate permission (Grant) of resource allocation.

In addition, in the first example embodiment, for example, the terminal apparatus 400A, the terminal apparatus 400B, and the terminal apparatus 400C use frequency hopping. When the pattern of frequency hopping of the terminal apparatus 400A is the same as the patterns of frequency hopping of the terminal apparatus 400B and the terminal apparatus 400C, interference in the base station 100 is not reduced. On the other hand, when the pattern of frequency hopping of the terminal apparatus 400A is different from the patterns of frequency hopping of the terminal apparatus 400B and the terminal apparatus 400C, interference in the base station 100 may be reduced.

<<2.2. Configuration of Each Node>>

Figure 3:
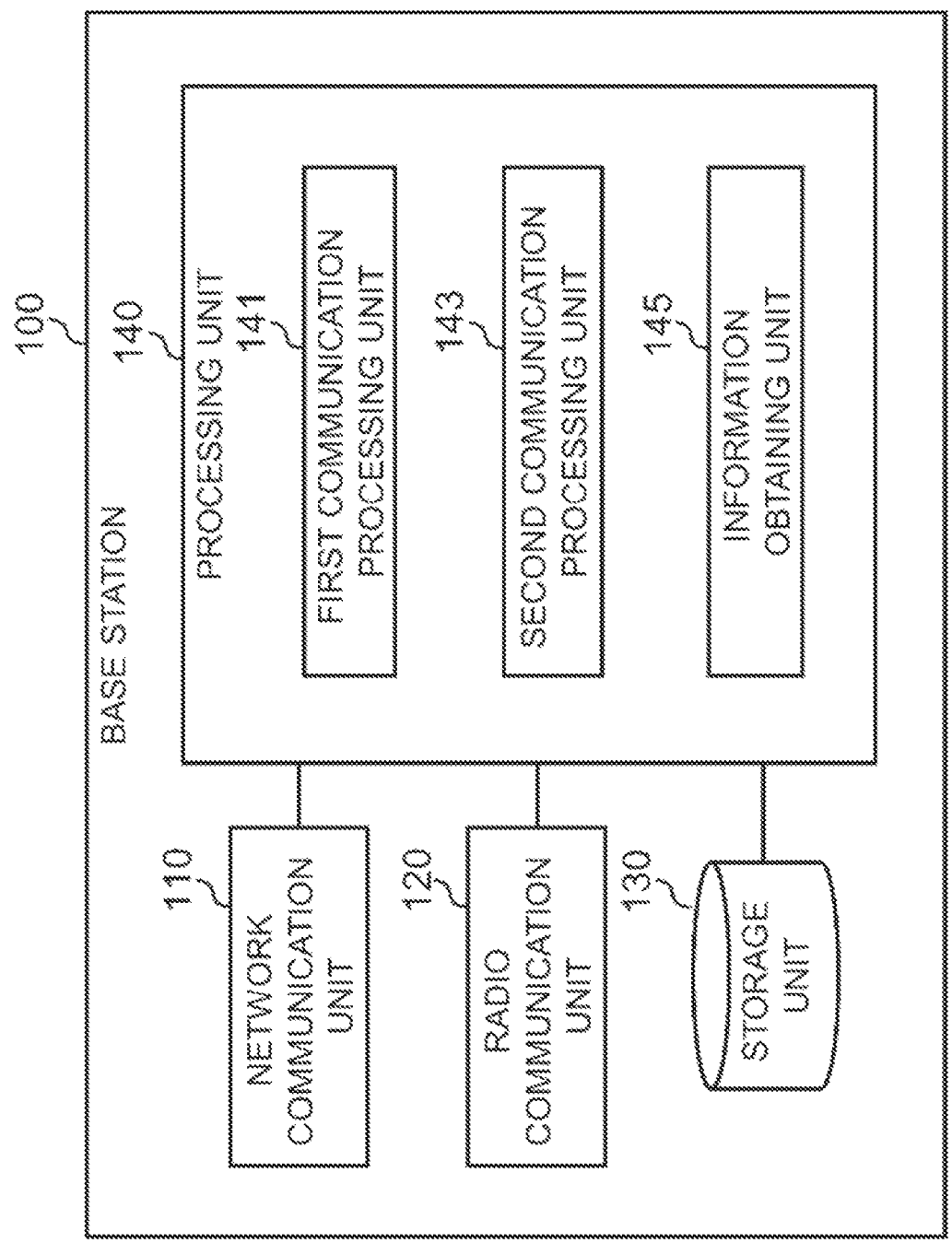
FIG. 3 is a block diagram illustrating an example of a schematic configuration of a base station 100 according to the first example embodiment.
Figure 4:
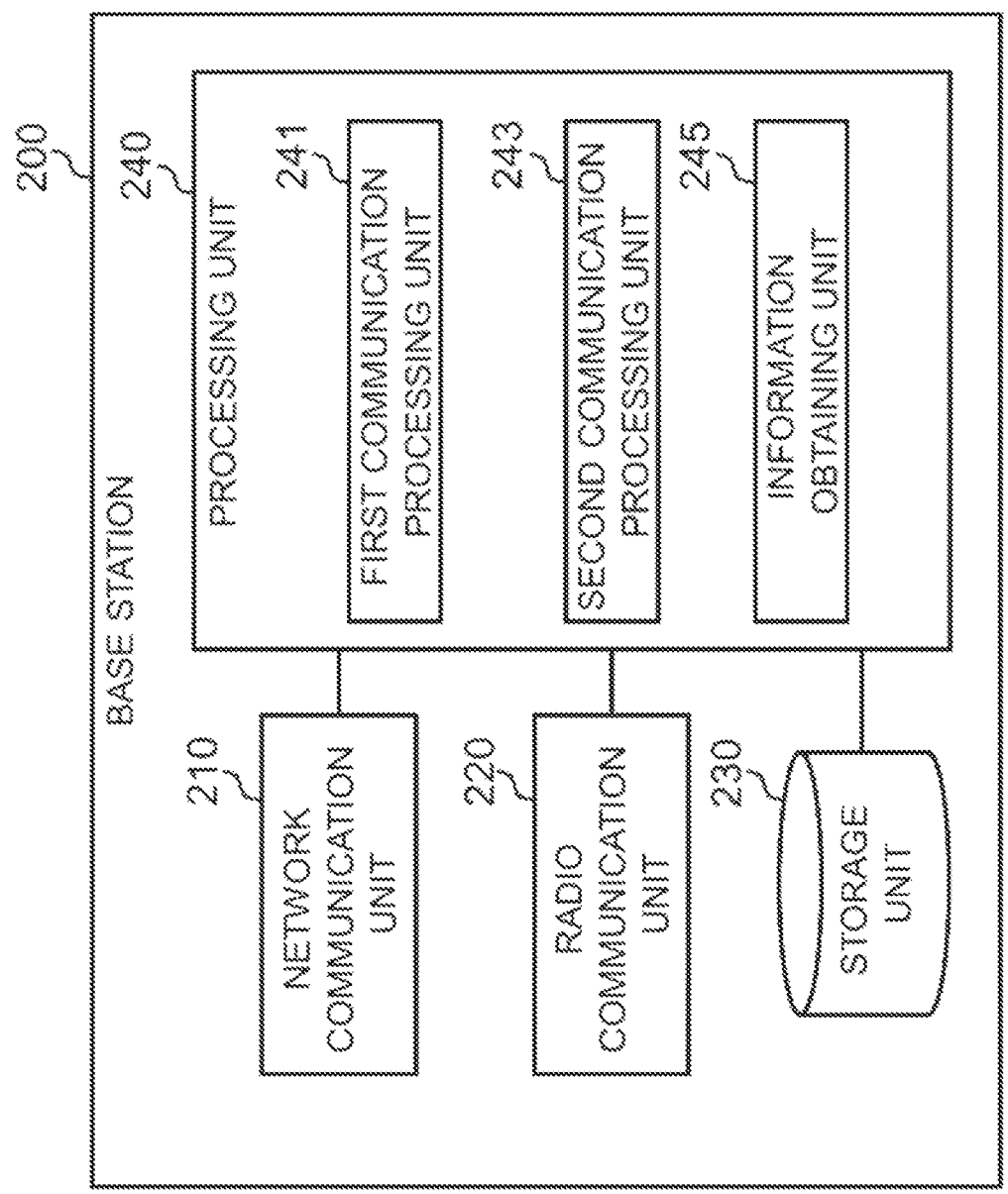
FIG. 4 is a block diagram illustrating an example of a schematic configuration of a base station 200 according to the first example embodiment.
Figure 5:
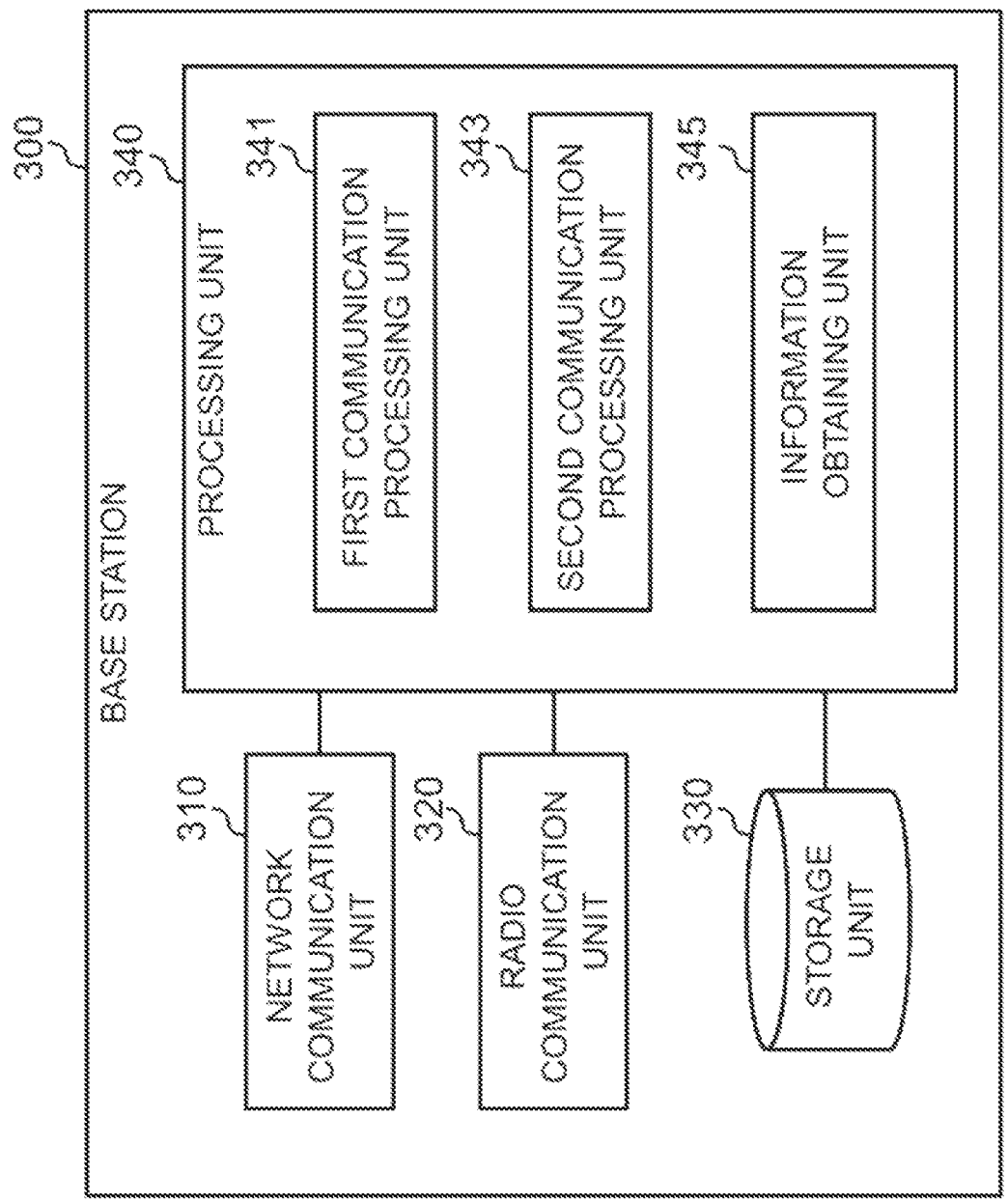
FIG. 5 is a block diagram illustrating an example of a schematic configuration of a base station 300 according to the first example embodiment.

With reference to FIG. 3 to FIG. 5, a configuration of each node according to the first example embodiment will be described.

<2.2.1. Configuration of Base Station 100>

FIG. 3 is a block diagram illustrating an example of a schematic configuration of the base station 100 according to the first example embodiment. With reference to FIG. 3, the base station 100 includes a network communication unit 110, a radio communication unit 120, a storage unit 130, and a processing unit 140.

(1) Network Communication Unit 110

The network communication unit 110 receives a signal from a network, and transmits a signal to a network.

(2) Radio Communication Unit 120

The radio communication unit 120 wirelessly transmits and receives a signal. For example, the radio communication unit 120 receives a signal from the terminal apparatus, and transmits a signal to the terminal apparatus.

(3) Storage Unit 130

The storage unit 130 temporarily or permanently stores programs (instructions) and parameters for operations of the base station 100 as well as various data. The program includes one or more instructions for operations of the base station 100.

(4) Processing Unit 140

The processing unit 140 provides various functions of the base station 100. The processing unit 140 includes a first communication processing unit 141, a second communication processing unit 143, and an information obtaining unit 145. Note that the processing unit 140 may further include another constituent element different from these constituent elements. In other words, the processing unit 140 may also perform operations other than the operations of these constituent elements. Specific operations of the first communication processing unit 141, the second communication processing unit 143, and the information obtaining unit 145 will be described later in detail.

For example, the processing unit 140 (first communication processing unit 141) communicates with another network node (for example, the base station 200 or the base station 300) via the network communication unit 110. For example, the processing unit 140 (second communication processing unit 143) communicates with the terminal apparatus (for example, the terminal apparatus 400A) via the radio communication unit 120.

(5) Implementation Example

The network communication unit 110 may be implemented with a network adapter and/or a network interface card, and the like. The radio communication unit 120 may be implemented with an antenna, a radio frequency (RF) circuit, and the like, and the antenna may be a directional antenna. The storage unit 130 may be implemented with a memory (e.g., a nonvolatile memory and/or a volatile memory) and/or a hard disk, and the like. The processing unit 140 may be implemented with one or more processors, such as a baseband (BB) processor and/or a different kind of processor. The first communication processing unit 141, the second communication processing unit 143, and the information obtaining unit 145 may be implemented with the same processor or may be implemented with separate processors. The memory (storage unit 130) may be included in the one or more processors or may be provided outside the one or more processors.

The base station 100 may include a memory configured to store a program (instructions) and one or more processors that can execute the program (instructions). The one or more processors may execute the program and thereby perform operations of the processing unit 140 (operations of the first communication processing unit 141, the second communication processing unit 143, and/or the information obtaining unit 145). The program may be a program for causing the processor(s) to execute the operations of the processing unit 140 (operations of the first communication processing unit 141, the second communication processing unit 143, and/or the information obtaining unit 145).

Note that the base station 100 may be virtual. In other words, the base station 100 may be implemented as a virtual machine. In this case, the base station 100 (the virtual machine) may operate as a physical machine (hardware) including a processor, a memory, and the like, and a virtual machine on a hypervisor.

<2.2.2. Configuration of Base Station 200>

FIG. 4 is a block diagram illustrating an example of a schematic configuration of the base station 200 according to the first example embodiment. With reference to FIG. 4, the base station 200 includes a network communication unit 210, a radio communication unit 220, a storage unit 230, and a processing unit 240.

(1) Network Communication Unit 210

The network communication unit 210 receives a signal from a network, and transmits a signal to a network.

(2) Radio Communication Unit 220

The radio communication unit 220 wirelessly transmits and receives a signal. For example, the radio communication unit 220 receives a signal from the terminal apparatus, and transmits a signal to the terminal apparatus.

(3) Storage Unit 230

The storage unit 230 temporarily or permanently stores programs (instructions) and parameters for operations of the base station 200 as well as various data. The program includes one or more instructions for operations of the base station 200.

(4) Processing Unit 240

The processing unit 240 provides various functions of the base station 200. The processing unit 240 includes a first communication processing unit 241, a second communication processing unit 243, and an information obtaining unit 245. Note that the processing unit 240 may further include another constituent element different from these constituent elements. In other words, the processing unit 240 may also perform operations other than the operations of these constituent elements. Specific operations of the first communication processing unit 241, the second communication processing unit 243, and the information obtaining unit 245 will be described later in detail.

For example, the processing unit 240 (first communication processing unit 241) communicates with another network node (for example, the base station 100 or the base station 300) via the network communication unit 210. For example, the processing unit 240 (second communication processing unit 243) communicates with the terminal apparatus (for example, the terminal apparatus 400B) via the radio communication unit 220.

(5) Implementation Example

The network communication unit 210 may be implemented with a network adapter and/or a network interface card, and the like. The radio communication unit 220 may be implemented with an antenna, a radio frequency (RF) circuit, and the like, and the antenna may be a directional antenna. The storage unit 230 may be implemented with a memory (e.g., a nonvolatile memory and/or a volatile memory) and/or a hard disk, and the like. The processing unit 240 may be implemented with one or more processors, such as a baseband (BB) processor and/or a different kind of processor. The first communication processing unit 241, the second communication processing unit 243, and the information obtaining unit 245 may be implemented with the same processor or may be implemented with separate processors. The memory (storage unit 230) may be included in the one or more processors or may be provided outside the one or more processors.

The base station 200 may include a memory configured to store a program (instructions) and one or more processors that can execute the program (instructions). The one or more processors may execute the program and thereby perform operations of the processing unit 240 (operations of the first communication processing unit 241, the second communication processing unit 243, and/or the information obtaining unit 245). The program may be a program for causing the processor(s) to execute the operations of the processing unit 240 (operations of the first communication processing unit 241, the second communication processing unit 243, and/or the information obtaining unit 245).

Note that the base station 200 may be virtual. In other words, the base station 200 may be implemented as a virtual machine. In this case, the base station 200 (the virtual machine) may operate as a physical machine (hardware) including a processor, a memory, and the like, and a virtual machine on a hypervisor.

<2.2.3. Configuration of Base Station 300>

FIG. 5 is a block diagram illustrating an example of a schematic configuration of the base station 300 according to the first example embodiment. With reference to FIG. 5, the base station 300 includes a network communication unit 310, a radio communication unit 320, a storage unit 330, and a processing unit 340.

(1) Network Communication Unit 310

The network communication unit 310 receives a signal from a network, and transmits a signal to a network.

(2) Radio Communication Unit 320

The radio communication unit 320 wirelessly transmits and receives a signal. For example, the radio communication unit 320 receives a signal from the terminal apparatus, and transmits a signal to the terminal apparatus.

(3) Storage Unit 330

The storage unit 330 temporarily or permanently stores programs (instructions) and parameters for operations of the base station 300 as well as various data. The program includes one or more instructions for operations of the base station 300.

(4) Processing Unit 340

The processing unit 340 provides various functions of the base station 300. The processing unit 340 includes a first communication processing unit 341, a second communication processing unit 343, and an information obtaining unit 345. Note that the processing unit 340 may further include another constituent element different from these constituent elements. In other words, the processing unit 340 may also perform operations other than the operations of these constituent elements. Specific operations of the first communication processing unit 341, the second communication processing unit 343, and the information obtaining unit 345 will be described later in detail.

For example, the processing unit 340 (first communication processing unit 341) communicates with another network node (for example, the base station 100 or the base station 200) via the network communication unit 310. For example, the processing unit 340 (second communication processing unit 343) communicates with the terminal apparatus (for example, the terminal apparatus 400C) via the radio communication unit 320.

(5) Implementation Example

The network communication unit 310 may be implemented with a network adapter and/or a network interface card, and the like. The radio communication unit 320 may be implemented with an antenna, a radio frequency (RF) circuit, and the like, and the antenna may be a directional antenna. The storage unit 330 may be implemented with a memory (e.g., a nonvolatile memory and/or a volatile memory) and/or a hard disk, and the like. The processing unit 340 may be implemented with one or more processors, such as a baseband (BB) processor and/or a different kind of processor. The first communication processing unit 341, the second communication processing unit 343, and the information obtaining unit 345 may be implemented with the same processor or may be implemented with separate processors. The memory (storage unit 330) may be included in the one or more processors or may be provided outside the one or more processors.

The base station 300 may include a memory configured to store a program (instructions) and one or more processors that can execute the program (instructions). The one or more processors may execute the program and thereby perform operations of the processing unit 340 (operations of the first communication processing unit 341, the second communication processing unit 343, and/or the information obtaining unit 345). The program may be a program for causing the processor(s) to execute the operations of the processing unit 340 (operations of the first communication processing unit 341, the second communication processing unit 343, and/or the information obtaining unit 345).

Note that the base station 300 may be virtual. In other words, the base station 300 may be implemented as a virtual machine. In this case, the base station 300 (the virtual machine) may operate as a physical machine (hardware) including a processor, a memory, and the like, and a virtual machine on a hypervisor.

<<2.3. Technical Features>>

With reference to FIG. 6 to FIG. 10, technical features of the first example embodiment will be described.

(1) Determination of Frequency Hopping Pattern by Base Station 100

According to the first example embodiment, the base station 100 (first communication processing unit 141) communicates with a first terminal apparatus (for example, the terminal apparatus 400A). The base station 100 (second communication processing unit 143) receives, from a second base station (for example, the base station 200, 300) communicating with a second terminal apparatus (for example, the terminal apparatus 400B, 400C), radio resource time length information for specifying a time length of a radio resource for the second terminal apparatus, and hopping pattern information for specifying a frequency hopping pattern for the second terminal apparatus. Then, the base station 100 (first communication processing unit 141) determines the frequency hopping pattern for the first terminal apparatus, based on the radio resource time length information and the hopping pattern information, and communicates with the first terminal apparatus in accordance with the determined frequency hopping pattern.

—Radio Resources for Second Terminal Apparatus

Specifically, the second base station (for example, the base station 200, 300) accommodates a plurality of cells, for example, and configures the radio resources for the second terminal apparatus (for example, the terminal apparatus 400B, 400C) existing in each of the cells. Then, the second base station (for example, the base station 200, 300) individually configures the hopping pattern for each second terminal apparatuses (for example, the terminal apparatus 400B, 400C).

—Terminal Apparatus

For example, the first terminal apparatus is a terminal apparatus to which the Configured Grant (CG) for periodically (periodicity) allocating at least a part of radio resources for a specific terminal apparatus is applied. Similarly, the second terminal apparatus and the third terminal apparatus are each a terminal apparatus to which the CG is applied.

—Frequency Hopping

For example, the frequency hopping is frequency hopping of the uplink. Specifically, the frequency hopping is frequency hopping of the PUSCH. For example, the frequency hopping is inter-slot frequency hopping within a subframe.

—Hopping Pattern Information

For example, the hopping pattern control information is information for specifying one out of a list of a plurality of frequency hopping patterns as the pattern of the frequency hopping for the second terminal apparatus (for example, the terminal apparatus 400B, 400C). In this case, the hopping pattern control information may be information corresponding to a frequency offset of second hopping of the pattern of the frequency hopping.

Specifically, for example, the information related to the list of the plurality of hopping patterns may be, for example, information that is notified to the first terminal apparatus using an RRC message. In this case, the hopping pattern control information may be, for example, included in a Frequency domain resource assignment field in Downlink Control Information.

When frequency hopping is not performed for the second terminal apparatus (for example, the terminal apparatus 400B, 400C), the hopping pattern control information may indicate "without frequency hopping" as the pattern of the frequency hopping for the second terminal apparatus.

Note that the hopping pattern information may be information indicating the pattern of the frequency hopping for the second terminal apparatus.

—Radio Resource Time Length Information

The radio resource time length information is information for specifying the time length of the radio resource for the second terminal apparatus (for example, the terminal apparatus 400B, 400C) from a plurality of candidate time lengths.

Specifically, the radio resource time length information is information for specifying the time length of a slot for the second terminal apparatus (for example, the terminal apparatus 400B, 400C). Take the example illustrated in FIG. 2. When the second terminal apparatus is the terminal apparatus 400B, the radio resource time length information is information for specifying that the time length of a slot is a time length corresponding to ½ of the subframe 12. When the second terminal apparatus is the terminal apparatus 400B, the radio resource time length information is information for specifying that the time length of a slot is a time length corresponding to ¼ of the subframe 13.

For example, when the time length of the slot is associated with the subcarrier spacing (SCS), the radio resource time length information may be information corresponding to a configuration of the subcarrier spacing (subcarrier spacing configuration). In other words, by referring to information corresponding to the configuration of the subcarrier spacing (subcarrier spacing configuration), the time length of the slot can be specified.

In addition, when the second base station individually configures the subcarrier spacing (SCS) for each of a plurality of cells, the radio resource time length information may be information corresponding to a configuration of the subcarrier spacing (subcarrier spacing configuration) within the cell. In addition, the radio resource time length information may be one set including a combination of pieces of information corresponding to configurations of the subcarrier spacings (subcarrier spacing configurations) of each cell.

The radio resource time length information is not limited to the examples described above, and may be, for example, information for specifying the time length of a subframe for the second terminal apparatus (for example, the terminal apparatus 400B, 400C).

—Determination of Frequency Hopping Pattern

The base station 100 (information obtaining unit 145) obtains information indicating the time length of the radio resource for the first terminal apparatus (for example, the terminal apparatus 400A). Take the example illustrated in FIG. 2. The information indicating the time length of the radio resource for the terminal apparatus 400A is information indicating that it is the time length corresponding to the subframe 11.

The base station 100 (first communication processing unit 141) determines the frequency hopping pattern for the first terminal apparatus (for example, the terminal apparatus 400A), based on whether or not the time length of the radio resource for the first terminal apparatus (for example, the terminal apparatus 400A) is equal to the time length of the radio resource for the second terminal apparatus (for example, the terminal apparatus 400B, 400C) specified by the radio resource time length information.

Specifically, when the time length of the radio resource for the first terminal apparatus (for example, the terminal apparatus 400A) is equal to the time length of the radio resource for the second terminal apparatus (for example, the terminal apparatus 400B, 400C) specified by the radio resource time length information, the base station 100 (first communication processing unit 141) determines, as the frequency hopping pattern for the first terminal apparatus (for example, the terminal apparatus 400A), a frequency hopping pattern different from the frequency hopping pattern for the second terminal apparatus (for example, the terminal apparatus 400B, 400C) specified by the hopping pattern information.

In contrast, when the time length of the radio resource for the first terminal apparatus (for example, the terminal apparatus 400A) is different from the time length of the radio resource for the second terminal apparatus (for example, the terminal apparatus 400B, 400C) based on the radio resource time length information, the base station 100 (first communication processing unit 141) determines the frequency hopping pattern for the first terminal apparatus (for example, the terminal apparatus 400A) according to one of the following two determination methods, for example.

(First Determination Method)

For example, the base station 100 (first communication processing unit 141) may determine the frequency hopping pattern for the first terminal apparatus (for example, the terminal apparatus 400A), based on the time length of the radio resource for the first terminal apparatus (for example, the terminal apparatus 400A). In other words, the base station 100 (first communication processing unit 141) may determine the frequency hopping pattern for the first terminal apparatus (for example, the terminal apparatus 400A), based on the time length of the radio resource for the first terminal apparatus (for example, the terminal apparatus 400A), without taking the frequency hopping pattern for the second terminal apparatus (for example, the terminal apparatus 400B, 400C) into consideration.

(Second Determination Method)

For example, the base station 100 (first communication processing unit 141) may change the time length of the radio resource for the first terminal apparatus (for example, the terminal apparatus 400A) so as to be equal to the time length of the radio resource for the second terminal apparatus (for example, the terminal apparatus 400B, 400C), and determine, as the frequency hopping pattern for the first terminal apparatus (for example, the terminal apparatus 400A), a frequency hopping pattern different from the frequency hopping pattern for the second terminal apparatus (for example, the terminal apparatus 400B, 400C), based on the hopping pattern information.

—Notification of Information

The base station 100 (second communication processing unit 143) may transmit information for specifying the frequency hopping pattern for the first terminal apparatus (for example, the terminal apparatus 400A) to the second base station (base station 200, 300). Specifically, the base station 100 (second communication processing unit 143) may transmit the information for specifying the frequency hopping pattern for the first terminal apparatus (for example, the terminal apparatus 400A) to the second base station (terminal apparatus 400B, 400C) after determining the frequency hopping pattern for the first terminal apparatus (for example, the terminal apparatus 400A).

(2) Determination of Frequency Hopping Pattern by Base Stations 200 and 300

Note that not only the base station 100 but also the base station 200 and the base station 300 may determine the frequency hopping pattern for the first terminal apparatus, based on information received from another base station, and communicate with the first terminal apparatus in accordance with the determined frequency hopping pattern.

For example, the base station 200 (first communication processing unit 241) communicates with a first terminal apparatus (for example, the terminal apparatus 400B). The base station 200 (second communication processing unit 243) receives, from a second base station (base station 100, 300) communicating with a second terminal apparatus (for example, the terminal apparatus 400A, 400C), radio resource time length information for specifying a time length of a radio resource for the second terminal apparatus, and hopping pattern information for specifying a frequency hopping pattern for the second terminal apparatus. Then, the base station 200 (first communication processing unit 241) determines the frequency hopping pattern for the first terminal apparatus, based on the radio resource time length information and the hopping pattern information, and communicates with the first terminal apparatus in accordance with the determined frequency hopping pattern.

The base station 300 (first communication processing unit 341) communicates with a first terminal apparatus (for example, the terminal apparatus 400C). The base station 300 (second communication processing unit 343) receives, from a second base station (base station 100, 200) communicating with a second terminal apparatus (for example, the terminal apparatus 400A, 400B), radio resource time length information for specifying a time length of a radio resource for the second terminal apparatus, and hopping pattern information for specifying a frequency hopping pattern for the second terminal apparatus. Then, the base station 300 (first communication processing unit 341) determines the frequency hopping pattern for the first terminal apparatus, based on the radio resource time length information and the hopping pattern information, and communicates with the first terminal apparatus in accordance with the determined frequency hopping pattern.

Owing to such transmission of the information between the base stations as described above, for example, the frequency hopping patterns to be used (for the terminal apparatus to which the Configured Grant (CG) is applied) can be arranged to be different between the base stations. As a result, interference is reduced in a radio access network, and in particular, communication in the uplink can be improved.

(2-1) First Specific Example

Figure 6:
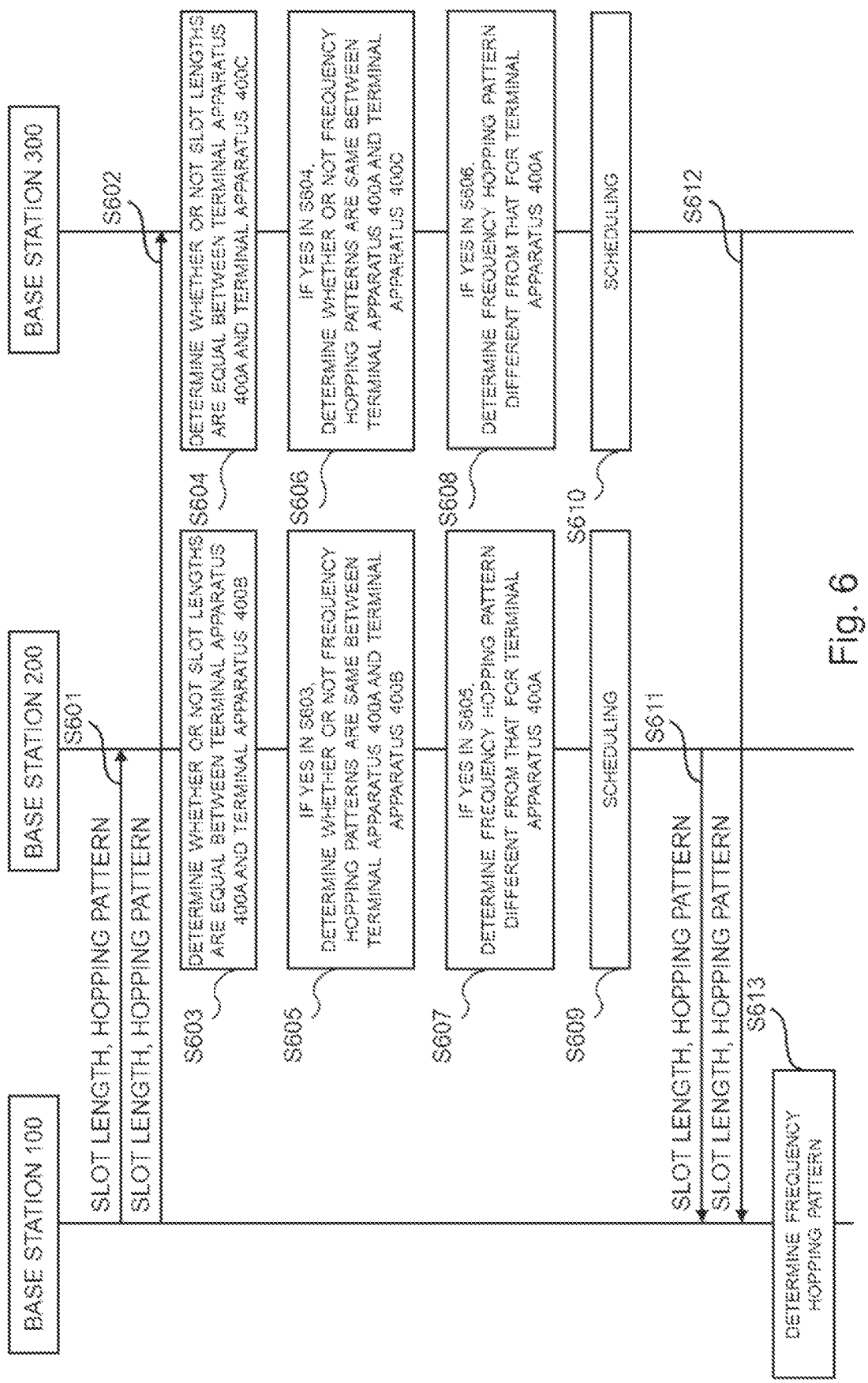
FIG. 6 is a sequence diagram for illustrating an example of a schematic flow of processing according to a first specific example.

FIG. 6 is a sequence diagram for illustrating an example of a schematic flow of processing according to a first specific example.

First, in the example illustrated in FIG. 6, the base station 100 (second communication processing unit 143) transmits slot time length (slot length) information of the radio resource for the terminal apparatus 400A and frequency hopping pattern information for the terminal apparatus 400A to the base station 200 (Step S601). Similarly, the base station 100 (first communication processing unit 142) transmits slot time length (slot length) information of the radio resource for the terminal apparatus 400A and frequency hopping pattern information for the terminal apparatus 400A to the base station 300 (Step S602).

The base station 200 (first communication processing unit 241) determines whether or not the slot length of the radio resource for the terminal apparatus 400B is equal to the slot length of the radio resource for the terminal apparatus 400A, based on the information received from the base station 100 (Step S603). Similarly, the base station 300 (first communication processing unit 341) determines whether or not the slot length of the radio resource for the terminal apparatus 400C is equal to the slot length of the radio resource for the terminal apparatus 400A, based on the information received from the base station 100 (Step S604).

When it is determined that the slot lengths are the same in Step S603 (S603: Yes), the base station 200 (first communication processing unit 241) determines whether or not the frequency hopping pattern selected for the terminal apparatus 400B is the same as the frequency hopping pattern for the terminal apparatus 400A (Step S605). Similarly, when it is determined that the slot lengths are the same in Step S604 (S604: Yes), the base station 300 (first communication processing unit 341) determines whether or not the frequency hopping pattern selected for the terminal apparatus 400C is the same as the frequency hopping pattern for the terminal apparatus 400A (Step S606).

When it is determined that the frequency hopping patterns are the same in Step S605 (S605: Yes), the base station 200 (first communication processing unit 241) determines, as the frequency hopping pattern for the terminal apparatus 400B, a frequency hopping pattern different from the frequency hopping pattern for the terminal apparatus 400A (Step S607). Similarly, when it is determined that the frequency hopping patterns are the same in Step S606 (S606: Yes), the base station 300 (first communication processing unit 341) determines, as the frequency hopping pattern for the terminal apparatus 400C, a frequency hopping pattern different from the frequency hopping pattern for the terminal apparatus 400A (Step S608).

The base station 200 (first communication processing unit 241) performs scheduling for the terminal apparatus 400B, based on the frequency hopping pattern determined in Step S607 (Step S609). Similarly, the base station 300 (first communication processing unit 341) performs scheduling for the terminal apparatus 400C, based on the frequency hopping pattern determined in Step S608 (Step S610).

The base station 200 (second communication processing unit 243) transmits information related to the frequency hopping pattern determined in Step S607 to the base station 100 (Step S611). Similarly, the base station 300 (second communication processing unit 343) transmits information related to the frequency hopping pattern determined in Step S608 to the base station 100 (Step S612).

The base station 100 (first communication processing unit 141) changes or determines, as the frequency hopping pattern for the terminal apparatus 400A, a frequency hopping pattern different from the frequency hopping pattern for the terminal apparatus 400B, 400C, for example, based on the information transmitted from the base station 200, 300 (Step S613).

(2-2) Second Specific Example

Figure 7:
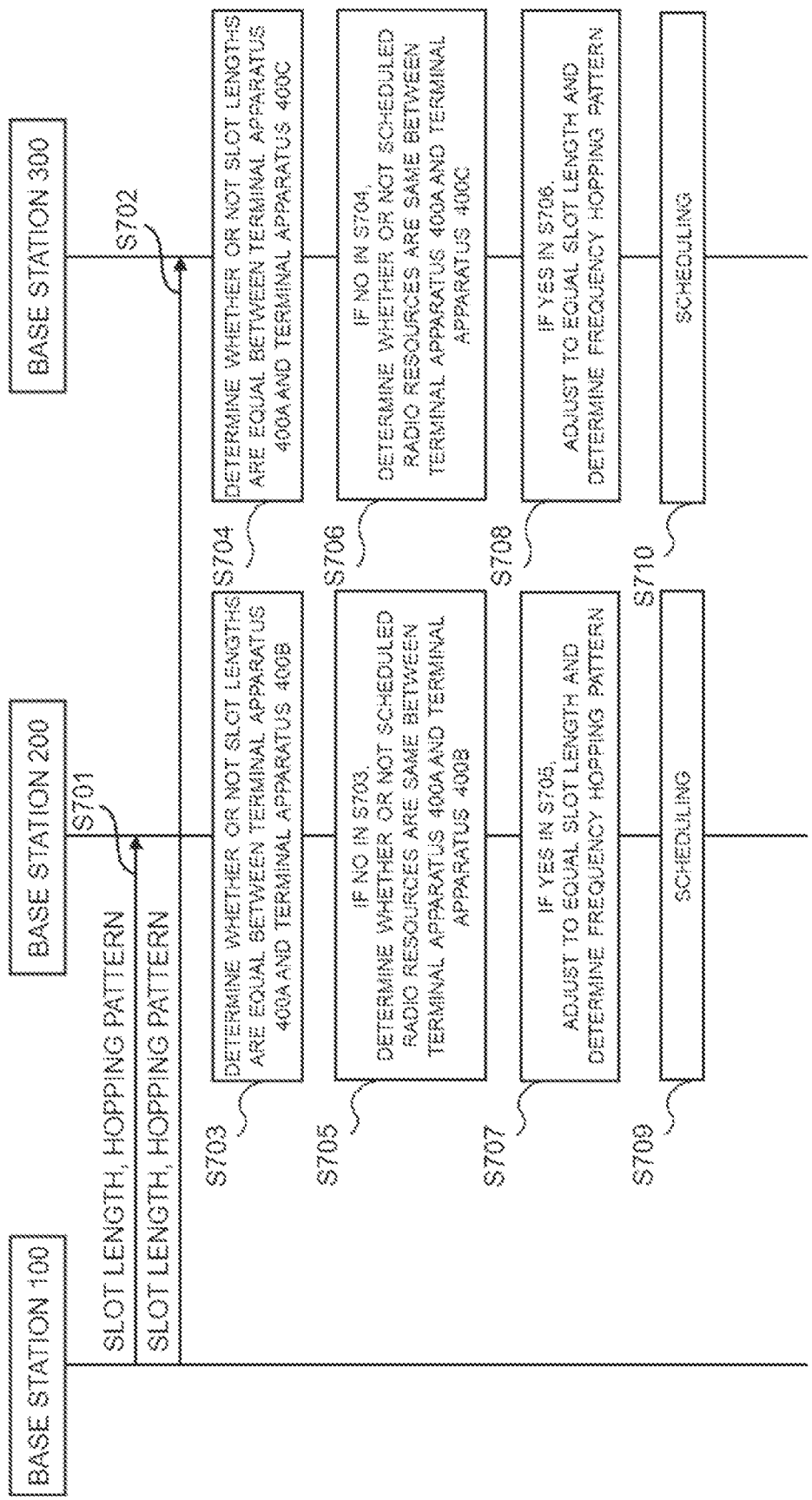
FIG. 7 is a sequence diagram for illustrating an example of a schematic flow of processing according to a second specific example.

FIG. 7 is a sequence diagram for illustrating an example of a schematic flow of processing according to a second specific example.

First, in the example illustrated in FIG. 7, the base station 100 (second communication processing unit 143) transmits slot time length (slot length) information of the radio resource for the terminal apparatus 400A and frequency hopping pattern information for the terminal apparatus 400A to the base station 200 (Step S701). Similarly, the base station 100 (first communication processing unit 142) transmits slot time length (slot length) information of the radio resource for the terminal apparatus 400A and frequency hopping pattern information for the terminal apparatus 400A to the base station 300 (Step S702).

The base station 200 (first communication processing unit 241) determines whether or not the slot length of the radio resource for the terminal apparatus 400B is equal to the slot length of the radio resource for the terminal apparatus 400A, based on the information received from the base station 100 (Step S703). Similarly, the base station 300 (first communication processing unit 341) determines whether or not the slot length of the radio resource for the terminal apparatus 400C is equal to the slot length of the radio resource for the terminal apparatus 400A, based on the information received from the base station 100 (Step S704).

When it is determined that the slot lengths are different in Step S703 (S703: No), the base station 200 (first communication processing unit 241) determines whether or not the radio resource scheduled for the terminal apparatus 400B by the base station 200 is the same as the radio resource scheduled for the terminal apparatus 400A by the base station 100 (Step S705). Similarly, when it is determined that the slot lengths are different in Step S704 (S704: No), the base station 300 (first communication processing unit 341) determines whether or not the radio resource scheduled for the terminal apparatus 400C by the base station 300 is the same as the radio resource scheduled for the terminal apparatus 400A by the base station 100 (Step S706).

When it is determined that the radio resources are the same in Step S705 (S705: Yes), the base station 200 (first communication processing unit 241) adjusts the slot length of the radio resource for the terminal apparatus 400B so as to be equal to the slot length of the radio resource for the terminal apparatus 400A. Then, the base station 200 (first communication processing unit 241) determines, as the frequency hopping pattern for the terminal apparatus 400B, a frequency hopping pattern different from the frequency hopping pattern for the terminal apparatus 400A (Step S707). Similarly, when it is determined that the radio resources are the same in Step S706 (S706: Yes), the base station 300 (first communication processing unit 341) adjusts the slot length of the radio resource for the terminal apparatus 400C so as to be equal to the slot length of the radio resource for the terminal apparatus 400A. Then, the base station 300 (first communication processing unit 341) determines, as the frequency hopping pattern for the terminal apparatus 400C, a frequency hopping pattern different from the frequency hopping pattern for the terminal apparatus 400A (Step S708).

The base station 200 (first communication processing unit 241) performs scheduling for the terminal apparatus 400B, based on the frequency hopping pattern determined in Step S707 (Step S709). Similarly, the base station 300 (first communication processing unit 341) performs scheduling for the terminal apparatus 400C, based on the frequency hopping pattern determined in Step S708 (Step S710).

Figure 8:
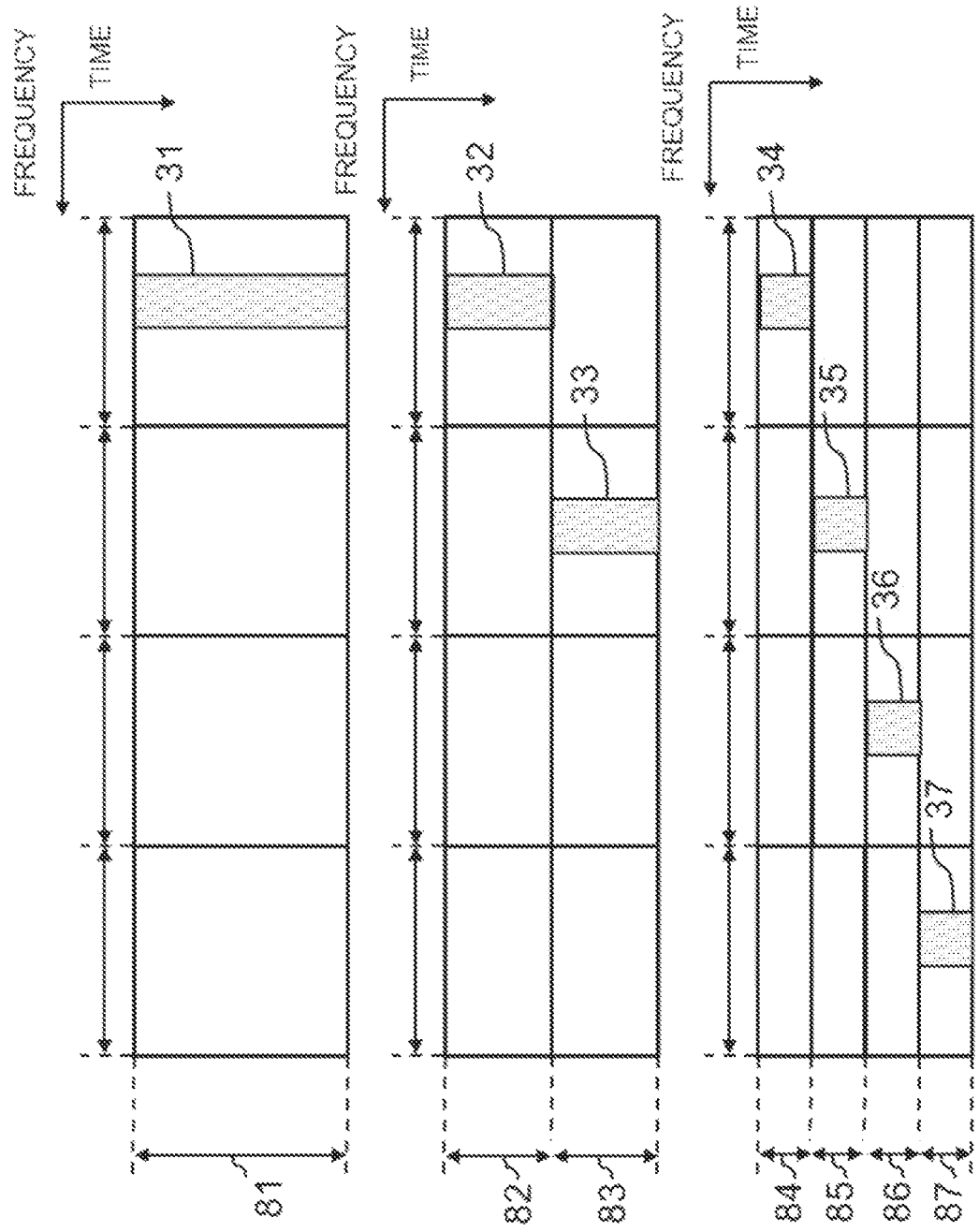
FIG. 8 is a diagram for illustrating a specific example of a case in which a frequency hopping pattern is determined by making an adjustment to be an equal slot length when slot lengths are different.

FIG. 8 is a diagram for illustrating a specific example of a case in which the frequency hopping pattern is determined by making an adjustment to be the equal slot length when the slot lengths are different.

In the example illustrated in FIG. 8, for example, the slot length of a slot 81 is 1 ms, the slot length of each of slots 82 and 83 is 0.5 ms, and the slot length of each of slots 84, 85, 86, and 87 is 0.25 ms. Here, for example, a focus is put on a case of making an adjustment to be the equal slot length of 0.5 ms. In this case, the slot 81 is divided into two slots. Regarding the slots 84, 85, 86, and 87, two adjacent slots are combined. In this manner, the slot length can be uniformly arranged to be 0.5 ms when frequency hopping is performed. Further, the hopping pattern can be determined so that the radio resources do not collide with each other between the terminal apparatuses. In particular, frequency and time resources used for the terminal apparatus to which the Configured Grant (CG) is applied can be arranged to be different between the base stations. As a result, interference can be reduced in a radio access network, and communication can be improved.

<<2.4. Example Alterations>>

For example, the system 1 illustrated in FIG. 1 may include four or more terminal apparatuses 400, or may include only one or two terminal apparatuses 400.

Information transmitted and received between the base stations 100, 200, and 300 may be an X2 message, or may be an Xn message.

Scheduling information from the base stations 100, 200, and 300 to the terminal apparatus 400 may be a Radio Resource Control (RRC) message.

FIG. 9 is a diagram for illustrating an example alteration according to the first example embodiment. With reference to FIG. 9, the slot lengths are the same between a set of slots 91 to 94 and another set of 95 to 98; however, the time lengths (TTI lengths) of the Transmission Time Interval (TTI) scheduled for the terminal apparatus are different.

In the example illustrated in FIG. 9, transmission information from the base station 100 to the base station 200 and transmission information from the base station 100 to the base station 300 may be scheduled TTI length information. In other words, when frequency hopping is performed, the TTI lengths may be adjusted so that different TTI lengths are uniformly arranged to be the equal TTI length, and the hopping pattern may be determined so that the radio resources do not collide with each other between the terminal apparatuses.

Figure 10:
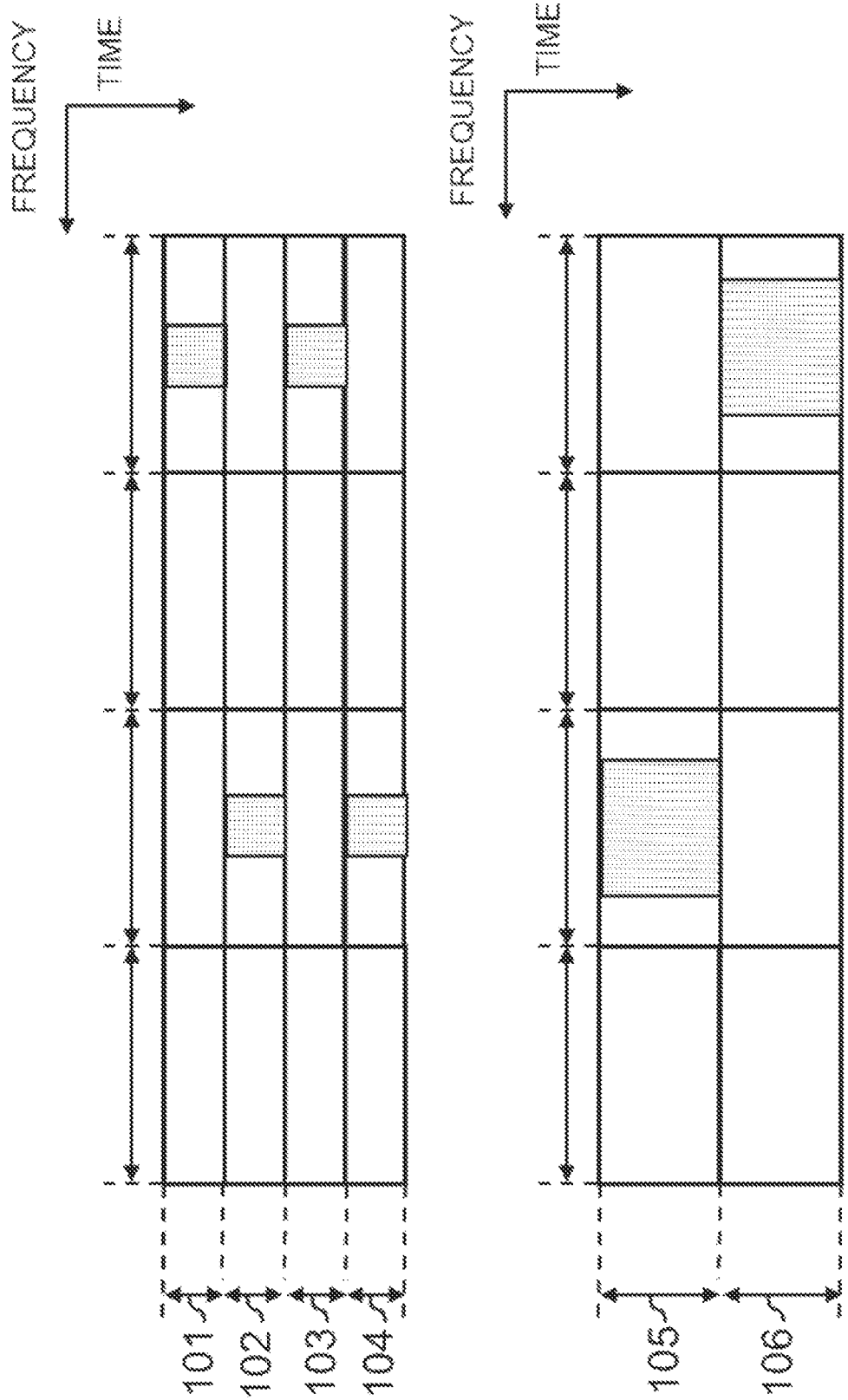
FIG. 10 is a diagram for illustrating another example alteration according to the first example embodiment.

FIG. 10 is a diagram for illustrating another example alteration according to the first example embodiment. With reference to FIG. 10, the slot lengths are different between a set of slots 101 to 104 and another set of 105 and 106, and the time lengths (TTI lengths) of the Transmission Time Interval (TTI) scheduled for the terminal apparatus are different.

In the example illustrated in FIG. 10, transmission information from the base station 100 to the base station 200 and transmission information from the base station 100 to the base station 300 may be a slot length and scheduled TTI length information. In other words, when frequency hopping is performed, the TTI lengths may be adjusted so that different slot lengths are uniformly arranged to be the equal slot length and that different TTI lengths are uniformly arranged to be the equal TTI length, and the hopping pattern may be determined so that the radio resources do not collide with each other between the terminal apparatuses.

When the first base station is a Center/Central Unit (CU) of a Centralized Radio Access Network (C-RAN), the first base station may notify a Distributed Unit (DU) under the first base station of the radio resource time length information and the hopping pattern information received from the second base station. When the second base station is a center/central unit of a C-RAN, the second base station may transmit, to the first base station, the radio resource time length information and the hopping pattern information generated by a distributed unit under the second base station.

3. Second Example Embodiment

Figure 11:
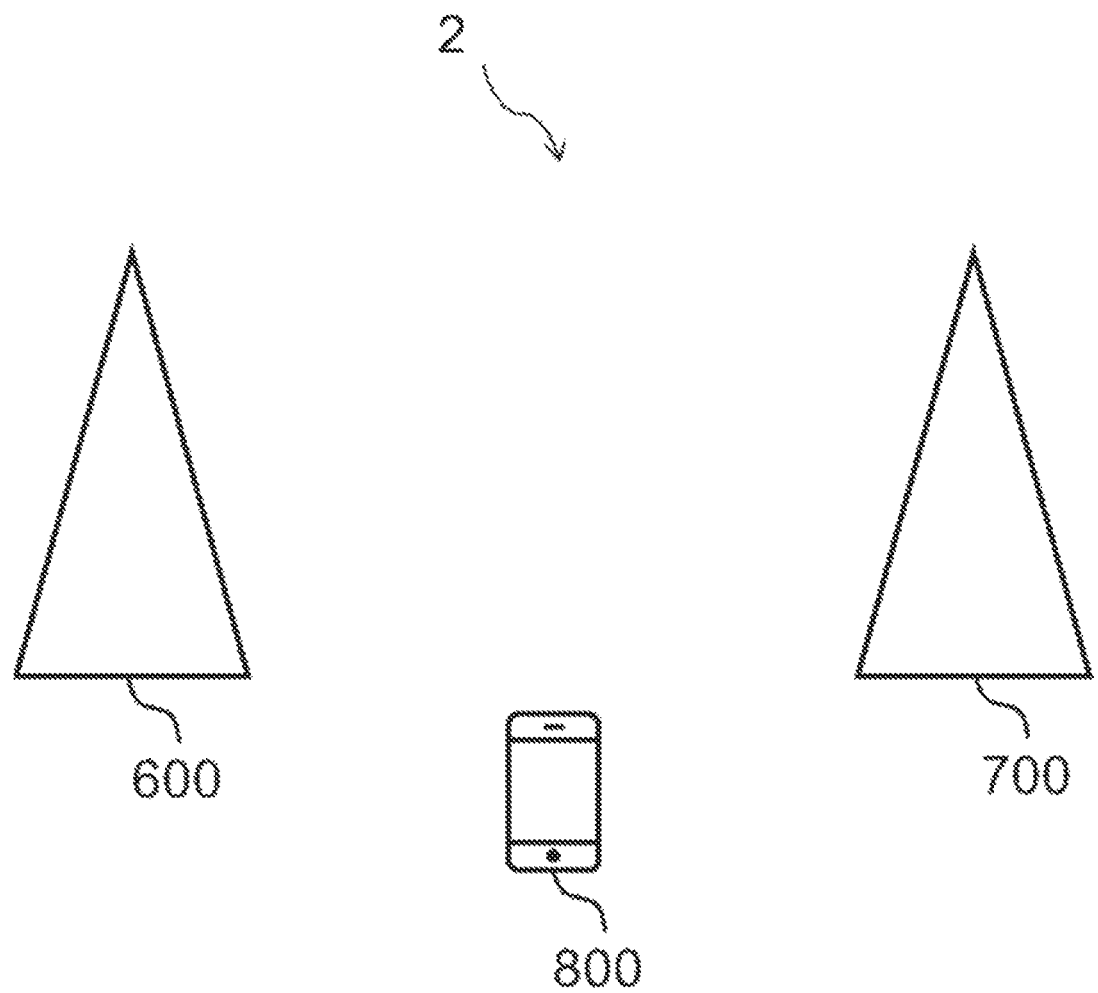
FIG. 11 is an explanatory diagram illustrating an example of a schematic configuration of a system 2 according to a second example embodiment.
Figure 12:
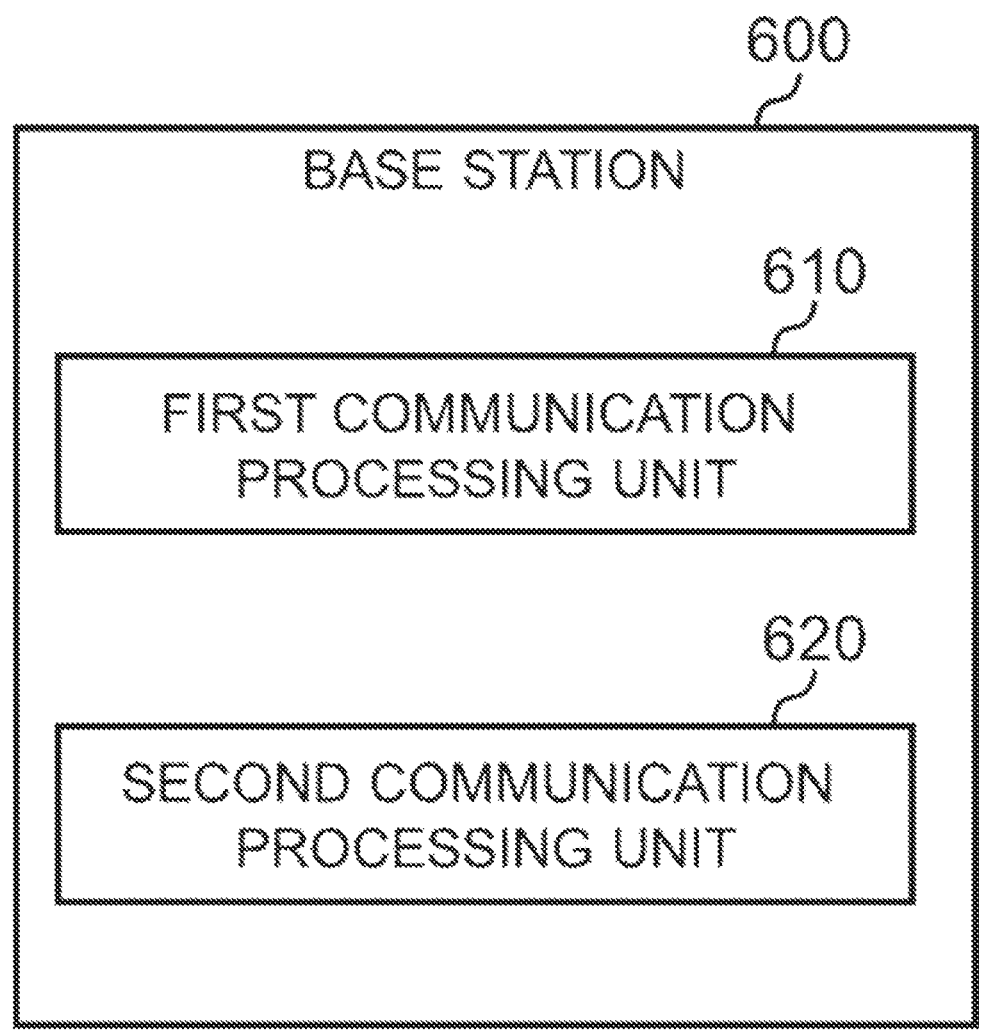
FIG. 12 is a block diagram illustrating an example of a schematic configuration of a base station 600 according to the second example embodiment.

With reference to FIG. 11 to FIG. 12, a second example embodiment will be described. The above-described first example embodiment is a concrete example embodiment, whereas the second example embodiment is a more generalized example embodiment.

<<3.1. Configuration of System>>

With reference to FIG. 11, an example of a configuration of a system 2 according to the second example embodiment will be described.

FIG. 11 is an explanatory diagram illustrating an example of a schematic configuration of the system 2 according to the second example embodiment. With reference to FIG. 11, the system 2 includes a base station 600, a base station 700, and a terminal apparatus 800. FIG. 11 illustrates only one terminal apparatus 800. However, the system 2 may include two or more terminal apparatuses 800.

For example, description of the base station 600 is the same as the description of the base station 100 according to the first example embodiment. For example, description of the base station 700 is the same as the description of the base station 200 or the base station 300 according to the first example embodiment. For example, description of the terminal apparatus 800 is the same as the description of the terminal apparatus 400 according to the first example embodiment. Thus, overlapping description will be omitted herein.

<<3.2. Configuration of Base Station 600>>

FIG. 12 is a block diagram illustrating an example of a schematic configuration of the base station 600 according to the second example embodiment. With reference to FIG. 12, the base station 600 includes a first communication processing unit 610 and a second communication processing unit 620. Specific operations of the first communication processing unit 610 and the second communication processing unit 620 will be described later.

The first communication processing unit 610 and the second communication processing unit 620 may be implemented with one or more processors, such as a baseband (BB) processor and/or a different kind of processor, a memory (e.g., a nonvolatile memory and/or a volatile memory), and/or a hard disk. The first communication processing unit 610 and the second communication processing unit 620 may be implemented with the same processor or may be implemented with separate processors. The memory may be included in the one or more processors or may be provided outside the one or more processors.

The base station 600 may include a memory configured to store a program (instructions) and one or more processors that can execute the program (instructions). The one or more processors may execute the program and thereby perform operations of the first communication processing unit 610 and the second communication processing unit 620. The program may be a program for causing the processor(s) to execute the operations of the first communication processing unit 610 and the second communication processing unit 620.

Note that the base station 600 may be virtual. In other words, the base station 600 may be implemented as a virtual machine. In this case, the base station 600 (the virtual machine) may operate as a physical machine (hardware) including a processor, a memory, and the like, and a virtual machine on a hypervisor.

<<3.3. Technical Features>>

Technical features according to the second example embodiment will be described.

According to the second example embodiment, the base station 600 (first communication processing unit 610) communicates with a first terminal apparatus (for example, the terminal apparatus 800). The base station 600 (second communication processing unit 620) receives, from a second base station (base station 700) communicating with a second terminal apparatus, radio resource time length information for specifying a time length of a radio resource for the second terminal apparatus, and hopping pattern information for specifying a frequency hopping pattern for the second terminal apparatus. Then, the base station 600 (first communication processing unit 610) determines the frequency hopping pattern for the first terminal apparatus, based on the radio resource time length information and the hopping pattern information, and communicates with the first terminal apparatus in accordance with the determined frequency hopping pattern.

—Relationship with First Example Embodiment

As an example, the base station 600, the base station 700, and the terminal apparatus 800 of the second example embodiment are the base station 100, the base station 200 (or the base station 300), and the terminal apparatus 400 (the terminal apparatus 400A or the terminal apparatus 400B) of the first example embodiment, respectively. In this case, the descriptions of the first example embodiment may be applicable to the second example embodiment as well.

Note that the second example embodiment is not limited to this example.

The second example embodiment has been described above. According to the second example embodiment, communication in a radio access network may be improved.

4. Other Example Embodiments

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

For example, the steps in the processing described in the Specification may not necessarily be executed in time series in the order described in the corresponding sequence diagram. For example, the steps in the processing may be executed in an order different from that described in the corresponding sequence diagram or may be executed in parallel. Some of the steps in the processing may be deleted, or more steps may be added to the processing.

An apparatus including constituent elements (e.g., the various communication processing units and/or the information obtaining unit) of the base station described in the Specification (e.g., one or more apparatuses (or units) among a plurality of apparatuses (or units) constituting the base station or a module for one of the plurality of apparatuses (or units)) may be provided. Moreover, methods including processing of the constituent elements may be provided, and programs for causing a processor to execute processing of the constituent elements may be provided. Moreover, non-transitory computer readable recording media (non-transitory computer readable media) having recorded thereon the programs may be provided. It is apparent that such apparatuses, modules, methods, programs, and non-transitory computer readable recording media are also included in the present invention.

The whole or part of the example embodiments disclosed above can be described as, but not limited to, the following supplementary notes.

(Supplementary Note 1)

A first base station comprising:

a first communication processing unit configured to communicate with a first terminal apparatus; and a second communication processing unit configured to receive, from a second base station communicating with a second terminal apparatus, radio resource time length information for specifying a time length of a radio resource for the second terminal apparatus, and hopping pattern information for specifying a frequency hopping pattern for the second terminal apparatus, wherein the first communication processing unit is configured to determine a frequency hopping pattern for the first terminal apparatus, based on the radio resource time length information and the hopping pattern information, and communicate with the first terminal apparatus in accordance with the determined frequency hopping pattern.

(Supplementary Note 2)

The first base station according to supplementary note 1, wherein the radio resource time length information is information for specifying the time length of the radio resource for the second terminal apparatus from a plurality of candidate time lengths.

(Supplementary Note 3)

The first base station according to supplementary note 1 or 2, wherein the radio resource time length information is information for specifying time length of a slot for the second terminal apparatus.

(Supplementary Note 4)

The first base station according to supplementary note 1 or 2, wherein the radio resource time length information is information for specifying time length of a subframe for the second terminal apparatus.

(Supplementary Note 5)

The first base station according to any one of supplementary notes 1 to 4, further comprising an information obtaining unit configured to obtain information indicating time length of radio resource for the first terminal apparatus, wherein the first communication processing unit is configured to determine the frequency hopping pattern for the first terminal apparatus, based on whether or not the time length of the radio resource for the first terminal apparatus is equal to the time length of the radio resource for the second terminal apparatus specified by the radio resource time length information.

(Supplementary Note 6)

The first base station according to supplementary note 5, wherein when the time length of the radio resource for the first terminal apparatus is equal to the time length of the radio resource for the second terminal apparatus specified by the radio resource time length information, the first communication processing unit is configured to determine, as the frequency hopping pattern for the first terminal apparatus, a frequency hopping pattern different from the frequency hopping pattern for the second terminal apparatus specified by the hopping pattern information.

(Supplementary Note 7)

The first base station according to supplementary note 5 or 6, wherein when the time length of the radio resource for the first terminal apparatus is different from the time length of the radio resource for the second terminal apparatus based on the radio resource time length information, the first communication processing unit is configured to determine the frequency hopping pattern for the first terminal apparatus, based on the time length of the radio resource for the first terminal apparatus.

(Supplementary Note 8)

The first base station according to supplementary note 5 or 6, wherein when the time length of the radio resource for the first terminal apparatus is different from the time length of the radio resource for the second terminal apparatus based on the radio resource time length information, the first communication processing unit is configured to change the time length of the radio resource for the first terminal apparatus so as to be equal to the time length of the radio resource for the second terminal apparatus, and determine, as the frequency hopping pattern for the first terminal apparatus, a frequency hopping pattern different from the frequency hopping pattern for the second terminal apparatus based on the hopping pattern information.

(Supplementary Note 9)

The first base station according to any one of supplementary notes 1 to 8, wherein the second communication processing unit is configured to transmit, to the second base station, information for specifying the frequency hopping pattern for the first terminal apparatus.

(Supplementary Note 10)

The first base station according to any one of supplementary notes 1 to 9, wherein the first terminal apparatus is a terminal apparatus to which a Configured Grant (CG) is applied.

(Supplementary Note 11)

A method used in a first base station comprising:

communicating with a first terminal apparatus; and receiving, from a second base station communicating with a second terminal apparatus, radio resource time length information for specifying a time length of a radio resource for the second terminal apparatus, and hopping pattern information for specifying a frequency hopping pattern for the second terminal apparatus, wherein the communicating with the first terminal apparatus includes determining a frequency hopping pattern for the first terminal apparatus, based on the radio resource time length information and the hopping pattern information, and communicating with the first terminal apparatus in accordance with the determined frequency hopping pattern.

(Supplementary Note 12)

A program that causes a processor in a first base station to execute:

communicating with a first terminal apparatus; and receiving, from a second base station communicating with a second terminal apparatus, radio resource time length information for specifying a time length of a radio resource for the second terminal apparatus, and hopping pattern information for specifying a frequency hopping pattern for the second terminal apparatus, wherein the communicating with the first terminal apparatus includes determining a frequency hopping pattern for the first terminal apparatus, based on the radio resource time length information and the hopping pattern information, and communicating with the first terminal apparatus in accordance with the determined frequency hopping pattern.

(Supplementary Note 13)

A non-transitory computer readable recording medium storing a program that causes a processor in a first base station to execute:

communicating with a first terminal apparatus; and
receiving, from a second base station communicating with a second terminal apparatus, radio resource time length information for specifying a time length of a radio resource for the second terminal apparatus, and hopping pattern information for specifying a frequency hopping pattern for the second terminal apparatus, wherein the communicating with the first terminal apparatus includes determining a frequency hopping pattern for the first terminal apparatus, based on the radio resource time length information and the hopping pattern information, and communicating with the first terminal apparatus in accordance with the determined frequency hopping pattern.

This application claims priority based on JP 2019-143900 filed on Aug. 5, 2019, the entire disclosure of which is incorporated herein.

INDUSTRIAL APPLICABILITY

In a mobile communication system, it is possible to improve communication in a radio access network.

REFERENCE SIGNS LIST 1, 2 System
100, 200, 300, 600, 700 Base Station
141, 241, 341, 610 First Communication Processing Unit
143, 243, 343, 620 Second Communication Processing Unit
145, 245, 345 Information Obtaining Unit
400, 800 Terminal Apparatus

What is claimed is:

1. A first base station comprising:
a memory storing instructions; and
one or more processors configured to execute the instructions to:
communicate with a first terminal apparatus; and
receive, from a second base station communicating with a second terminal apparatus, radio resource time length information for specifying a time length of a radio resource for the second terminal apparatus, and hopping pattern information for specifying a frequency hopping pattern for the second terminal apparatus; and
obtain information indicating a time length of a radio resource for the first terminal apparatus, wherein
the one or more processors are configured to execute the instructions to determine a frequency hopping pattern for the first terminal apparatus, based on the radio resource time length information and the hopping pattern information and based on whether or not the time length of the radio resource for the first terminal apparatus is equal to the time length of the radio resource for the second terminal apparatus specified by the radio resource time length information, and communicate with the first terminal apparatus in accordance with the determined frequency hopping pattern.

2. The first base station according to claim 1, wherein the radio resource time length information is information for specifying the time length of the radio resource for the second terminal apparatus from a plurality of candidate time lengths.

3. The first base station according to claim 1, wherein the radio resource time length information is information for specifying time length of a slot for the second terminal apparatus.

4. The first base station according to claim 1, wherein the radio resource time length information is information for specifying time length of a subframe for the second terminal apparatus.

5. The first base station according to claim 1, wherein when the time length of the radio resource for the first terminal apparatus is equal to the time length of the radio resource for the second terminal apparatus specified by the radio resource time length information, the one or more processors are configured to execute the instructions to determine, as the frequency hopping pattern for the first terminal apparatus, a frequency hopping pattern different from the frequency hopping pattern for the second terminal apparatus specified by the hopping pattern information.

6. The first base station according to claim 1, wherein when the time length of the radio resource for the first terminal apparatus is different from the time length of the radio resource for the second terminal apparatus based on the radio resource time length information, the one or more processors are configured to execute the instructions to determine the frequency hopping pattern for the first terminal apparatus, based on the time length of the radio resource for the first terminal apparatus.

7. The first base station according to claim 1, wherein when the time length of the radio resource for the first terminal apparatus is different from the time length of the radio resource for the second terminal apparatus based on the radio resource time length information, the one or more processors are configured to execute the instructions to change the time length of the radio resource for the first terminal apparatus so as to be equal to the time length of the radio resource for the second terminal apparatus, and determine, as the frequency hopping pattern for the first terminal apparatus, a frequency hopping pattern different from the frequency hopping pattern for the second terminal apparatus based on the hopping pattern information.

8. The first base station according to claim 1, wherein the one or more processors are configured to execute the instructions to transmit, to the second base station, information for specifying the frequency hopping pattern for the first terminal apparatus.

9. The first base station according to claim 1, wherein the first terminal apparatus is a terminal apparatus to which a Configured Grant (CG) is applied.

10. A method used in a first base station comprising:
communicating with a first terminal apparatus; and
receiving, from a second base station communicating with a second terminal apparatus, radio resource time length information for specifying a time length of a radio resource for the second terminal apparatus, and hopping pattern information for specifying a frequency hopping pattern for the second terminal apparatus; and
obtaining information indicating a time length of a radio resource for the first terminal apparatus, wherein
the communicating with the first terminal apparatus includes determining a frequency hopping pattern for the first terminal apparatus, based on the radio resource time length information and the hopping pattern information, and communicating with the first terminal apparatus in accordance with the determined frequency hopping pattern and based on whether or not the time length of the radio resource for the first terminal apparatus is equal to the time length of the radio resource for the second terminal apparatus specified by the radio resource time length information.

11. A non-transitory computer readable recording medium storing a program that causes a processor in a first base station to execute:

communicating with a first terminal apparatus; and receiving, from a second base station communicating with a second terminal apparatus, radio resource time length information for specifying a time length of a radio resource for the second terminal apparatus, and hopping pattern information for specifying a frequency hopping pattern for the second terminal apparatus; and obtaining information indicating a time length of a radio resource for the first terminal apparatus, wherein the communicating with the first terminal apparatus includes determining a frequency hopping pattern for the first terminal apparatus, based on the radio resource time length information and the hopping pattern information, and communicating with the first terminal apparatus in accordance with the determined frequency hopping pattern and based on whether or not the time length of the radio resource for the first terminal apparatus is equal to the time length of the radio resource for the second terminal apparatus specified by the radio resource time length information.

\* \* \* \* \*